(12) United States Patent
Ouyang et al.

(10) Patent No.: US 8,656,296 B1
(45) Date of Patent: Feb. 18, 2014

(54) SELECTION OF CHARACTERS IN A STRING OF CHARACTERS

(71) Applicant: Google Inc., Mountain View, CA (US)

(72) Inventors: Yu Ouyang, San Jose, CA (US); Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/747,214

(22) Filed: Jan. 22, 2013

Related U.S. Application Data

(60) Provisional application No. 61/706,440, filed on Sep. 27, 2012.

(51) Int. Cl.
| | |
|---|---|
| *G06F 3/048* | (2013.01) |
| *G06F 17/00* | (2006.01) |
| *G06F 3/01* | (2006.01) |

(52) U.S. Cl.
USPC ............ 715/770; 715/256; 715/702; 715/856

(58) Field of Classification Search
USPC .................. 715/770, 256, 974, 702, 724, 856
See application file for complete search history.

(56) References Cited

U.S. PATENT DOCUMENTS

| | | | |
|---|---|---|---|
| 4,566,000 | A | 1/1986 | Goldman et al. |
| 5,327,161 | A | 7/1994 | Logan et al. |
| 5,523,775 | A * | 6/1996 | Capps ........................... 345/179 |
| 5,666,113 | A | 9/1997 | Logan |
| 5,880,411 | A | 3/1999 | Gillespie et al. |
| 5,903,229 | A | 5/1999 | Kishki |
| 6,286,064 | B1 | 9/2001 | King et al. |
| 6,292,179 | B1 | 9/2001 | Lee |
| 6,704,034 | B1 * | 3/2004 | Rodriguez et al. ............ 715/860 |
| 6,801,190 | B1 | 10/2004 | Robinson et al. |
| 6,891,551 | B2 | 5/2005 | Keely et al. |
| 7,030,863 | B2 | 4/2006 | Long et al. |
| 7,032,171 | B1 * | 4/2006 | Carroll ........................ 715/246 |
| 7,042,443 | B2 | 5/2006 | Woodard et al. |
| 7,075,520 | B2 | 7/2006 | Williams |
| 7,088,345 | B2 | 8/2006 | Robinson et al. |
| 7,098,896 | B2 | 8/2006 | Kushler et al. |
| 7,145,554 | B2 | 12/2006 | Bachmann |
| 7,151,530 | B2 | 12/2006 | Roeber et al. |
| 7,199,786 | B2 | 4/2007 | Suraqui |
| 7,250,938 | B2 | 7/2007 | Kirkland et al. |

(Continued)

OTHER PUBLICATIONS

"iPhone text entry," accessed on Aug. 2, 2012, 4 pp.

(Continued)

*Primary Examiner* — Nicholas Ulrich
(74) *Attorney, Agent, or Firm* — Shumaker & Sieffert, P.A.

(57) ABSTRACT

A graphical user interface (GUI) displayed at a user interface device includes a character string that includes a substring. The computing device detects a movement of an input object from a first location on the user interface device to a second location on the user interface device. The first location corresponds to a second handle element and the second location corresponds to a particular position in the character string that is not at a beginning or end of the substring. In response, the computing device modifies the GUI such that the second handle element is located at the second location. The computing device also determines whether to select all characters of the substring. All characters of each substring completely displayed between a first handle element and the second handle element are also selected. The selected characters are visually differentiated from the non-selected characters.

20 Claims, 22 Drawing Sheets

(56) References Cited

U.S. PATENT DOCUMENTS

| | | |
|---|---|---|
| 7,251,367 B2 | 7/2007 | Zhai |
| 7,277,088 B2 | 10/2007 | Robinson et al. |
| 7,321,361 B2 | 1/2008 | Sato et al. |
| 7,453,439 B1 | 11/2008 | Kushler et al. |
| 7,508,324 B2 | 3/2009 | Suraqui |
| 7,571,393 B2 | 8/2009 | Premchandran et al. |
| 7,659,887 B2 | 2/2010 | Larsen et al. |
| 7,683,889 B2 | 3/2010 | Rimas Ribikauskas et al. |
| 7,706,616 B2 | 4/2010 | Kristensson et al. |
| 7,716,579 B2 | 5/2010 | Gunn et al. |
| 7,737,956 B2 | 6/2010 | Hsieh et al. |
| 7,750,891 B2 | 7/2010 | Stephanick et al. |
| 7,877,685 B2 * | 1/2011 | Peters ............ 715/272 |
| 7,921,361 B2 | 4/2011 | Gunn et al. |
| 8,036,878 B2 | 10/2011 | Assadollahi |
| 8,042,044 B2 * | 10/2011 | Van Leeuwen ............ 715/702 |
| 8,135,582 B2 | 3/2012 | Suraqui |
| 8,276,099 B2 * | 9/2012 | Yost ............ 715/856 |
| 8,356,059 B2 | 1/2013 | Wiljanen et al. |
| 8,365,059 B2 * | 1/2013 | Walsh et al. ............ 715/200 |
| 8,482,521 B2 | 7/2013 | Abe et al. |
| 2003/0068088 A1 * | 4/2003 | Janakiraman et al. ........ 382/229 |
| 2003/0234766 A1 | 12/2003 | Hildebrand |
| 2005/0076300 A1 * | 4/2005 | Martinez ............ 715/539 |
| 2005/0134578 A1 | 6/2005 | Chambers et al. |
| 2006/0005151 A1 | 1/2006 | Altman |
| 2006/0026535 A1 | 2/2006 | Hotelling et al. |
| 2006/0048071 A1 | 3/2006 | Jarrett et al. |
| 2006/0061557 A1 | 3/2006 | Kryrola |
| 2006/0119582 A1 | 6/2006 | Ng et al. |
| 2006/0176283 A1 | 8/2006 | Suraqui |
| 2006/0187216 A1 | 8/2006 | Trent et al. |
| 2007/0009070 A1 | 1/2007 | Lo et al. |
| 2007/0157085 A1 * | 7/2007 | Peters ............ 715/531 |
| 2007/0236475 A1 | 10/2007 | Wherry |
| 2007/0260981 A1 | 11/2007 | Kim et al. |
| 2007/0273664 A1 | 11/2007 | Kim et al. |
| 2008/0016467 A1 | 1/2008 | Chambers et al. |
| 2008/0079604 A1 | 4/2008 | Madonna et al. |
| 2008/0165142 A1 * | 7/2008 | Kocienda et al. ............ 345/173 |
| 2008/0307350 A1 | 12/2008 | Sabatelli et al. |
| 2008/0316183 A1 | 12/2008 | Westerman et al. |
| 2009/0058823 A1 | 3/2009 | Kocienda |
| 2009/0064045 A1 | 3/2009 | Tremblay |
| 2009/0109182 A1 * | 4/2009 | Fyke et al. ............ 345/173 |
| 2009/0178008 A1 | 7/2009 | Herz et al. |
| 2009/0189862 A1 * | 7/2009 | Viberg ............ 345/168 |
| 2009/0213134 A1 | 8/2009 | Stephanick et al. |
| 2009/0228842 A1 | 9/2009 | Westerman et al. |
| 2010/0013852 A1 | 1/2010 | Liu |
| 2010/0123724 A1 | 5/2010 | Moore et al. |
| 2010/0134425 A1 | 6/2010 | Storrusten |
| 2010/0153879 A1 * | 6/2010 | Rimas-Ribikauskas et al. ............ 715/810 |
| 2010/0214237 A1 | 8/2010 | Echeverri et al. |
| 2010/0235778 A1 | 9/2010 | Kocienda et al. |
| 2010/0235783 A1 | 9/2010 | Ording et al. |
| 2010/0238138 A1 | 9/2010 | Goertz et al. |
| 2010/0273379 A1 | 10/2010 | Chen et al. |
| 2010/0287486 A1 | 11/2010 | Coddington |
| 2010/0293460 A1 | 11/2010 | Budelli |
| 2011/0083105 A1 | 4/2011 | Shin et al. |
| 2011/0090151 A1 | 4/2011 | Huang et al. |
| 2011/0134068 A1 | 6/2011 | Shimoni |
| 2011/0193788 A1 | 8/2011 | King et al. |
| 2011/0231789 A1 | 9/2011 | Bukurak et al. |
| 2011/0239110 A1 * | 9/2011 | Garrett et al. ............ 715/256 |
| 2011/0239153 A1 * | 9/2011 | Carter et al. ............ 715/784 |
| 2011/0320978 A1 | 12/2011 | Herodezky et al. |
| 2012/0013541 A1 * | 1/2012 | Boka et al. ............ 345/173 |
| 2012/0036469 A1 | 2/2012 | Suraqui |
| 2012/0139844 A1 * | 6/2012 | Ramstein et al. ............ 345/173 |
| 2012/0185787 A1 * | 7/2012 | Lisse et al. ............ 715/762 |
| 2012/0192117 A1 | 7/2012 | Migos et al. |
| 2012/0268387 A1 * | 10/2012 | Kuo et al. ............ 345/173 |
| 2012/0306772 A1 * | 12/2012 | Tan et al. ............ 345/173 |
| 2012/0311437 A1 | 12/2012 | Weeldreyer et al. |
| 2013/0002719 A1 | 1/2013 | Ide |
| 2013/0024820 A1 | 1/2013 | Kirkpatrick |
| 2013/0036388 A1 | 2/2013 | Kirkpatrick |
| 2013/0042199 A1 * | 2/2013 | Fong et al. ............ 715/780 |

OTHER PUBLICATIONS

"BlackBerry Torch 9800 Smartphone Version 6.0," User Guide, retrieved from www.blackberry.com/docs/smartphones, accessed on May 27, 2011, 15 pp.

De Silva et al., "Human Factors Evaluation of a Vision-Based Facial Gesture Interace," 2003, IEEE, 8 pp.

Ahmad et al., "A Keystroke and Pointer Control Input Interface for Wearable Computers" 2006, IEEE, 10 pp.

An Introduction to Writing Systems & Unicode, retrieved from http://rishida.net/docs/unicode-tutorial/toc, accessed on May 15, 2012, 20 pp.

Accessibility Solutions for iPhone, retrieved from http://www.apple.com/accessibility/iphone/hearing.html, accessed on Aug. 16, 2012, 4 pp.

Williams, "How to highlight, cut, copy and past using a BlackBerry Z10 smartphone," retrieved from http://helpblog.blackberry.com/2013/04/blackberry-z10-text-edit/, Apr. 10, 2013, 3 pp.

Neo, "Select, copy and past text on Android the easy way," retrieved from http://74.55.73.196/~shanzai/index.php/guides.html?start=225, Oct. 14, 2010, 3 pp.

BlackBerry Bold 9700 Smartphone 5.0 User Guide, Typing Shortcuts, retrieved from www.blackberry.com/docs/smartphones, accessed on May 16, 2012, 1 p.

BlackBerry Bold 9700 Smartphone 5.0 User Guide, Typing Shortcuts, retrieved from www.blackberry.com/docs/smartphones, accessed on May 17, 2011, 327 pp.

BlackBerry Torch 9800 Smartphone Version 6.0, User Guide, retrieved from www.blackberry.com/docs/smartphones, accessed on Jan. 19, 2011, 302 pp.

Natasha Lomas, "Hey Apple, What the Next iPhone Really, Really Needs Is a Much Better Keyboard," http://techcrunch.com/2013/04/21/the-iphone-keyboard-stinks/?, Apr. 21, 2013, 6 pp.

* cited by examiner

SELECTION OF CHARACTERS IN A STRING OF CHARACTERS

This application claims the benefit of U.S. Provisional Patent Application No. 61/706,440, filed Sep. 27, 2012, the entire content of which is incorporated herein by reference.

BACKGROUND

Most computing devices output text for display at a display device (such as a touchscreen). When a user of the computing device provides input to indicate selection of a portion of the text, the computing device can adjust what is output at the display device to indicate the selection (e.g., by highlighting the selected portion of the text). In some conventional systems, the input may be a sliding gesture that starts at a location on a user interface device (such as a trackpad, touchscreen, or other presence-sensitive input device coupled to the computing device) that corresponds to the first character in a series of characters comprising the portion of the text and terminates at a location on the user interface device that corresponds to the last character in the series of characters.

In some instances, a user wants to select a series of characters in order to perform an operation on the series of characters. For example, the user may want to select a series of characters in order to delete the series of characters, copy the series of characters, change the font or font size of the series of characters, or perform another operation on the series of characters. To assist the user in selecting a series of characters, handle elements may be displayed. The user changes which characters are selected by performing sliding gestures to drag the handle elements to appropriate positions. Because the characters may be small, it may be difficult for the user to accurately position the handle elements. Furthermore, in some instances, a user wants to change the position of a cursor so that the user can change where text is inserted or deleted. The user may change the position of the cursor by performing a sliding gesture to drag the cursor to the desired position. Because the cursor may be small, it may be difficult for the user to accurately reposition the cursor.

SUMMARY

In one example, this disclosure describes a method that comprises outputting, by a computing device, a (graphical user interface) GUI for display at a display device. The GUI includes a first handle element, a second handle element, and a character string that includes a series of substrings. The method also comprises detecting, by the computing device, a movement of an input object from a first location on the user interface device to a second location on the user interface device. The first location corresponds to the second handle element. The second location corresponds to a particular position in the character string that is not at a beginning or an end of a substring in the series of substrings. Furthermore, the method comprises, in response to detecting the movement of the input object, modifying, by the computing device, the GUI, such that the second handle element indicates the particular position in the character string. The method also comprises, in response to detecting the movement of the input object, determining, by the computing device and based at least in part on a speed of the movement of the input object, whether to include all characters of the substring in a series of selected characters. The series of selected characters further includes all characters of each of the substrings that are completely displayed between the first handle element and the second handle element. In addition, the method comprises, in response to detecting the movement of the input object, modifying, by the computing device and based at least in part on the determination, the GUI, such that the series of selected characters is visually differentiated from characters in the character string that are not in the series of selected characters.

In another example, this disclosure describes a computing device that comprises one or more processors and one or more storage devices that store instructions that, when executed by the one or more processors, cause the computing device to output a GUI for display at a display device. The GUI includes a first handle element, a second handle element, and a character string that includes a series of substrings. Each of the substrings being a word or a number. The instructions also cause the computing device to detect a movement of an input object from a first location on the user interface device to a second location on the user interface device. The first location corresponds to the second handle element. The second location corresponds to a particular position in the character string that is not at a beginning or an end of a substring in the series of substrings. In response to detecting the movement of the input object, the instructions cause the computing device to modify the GUI such that the second handle element indicates the particular position in the character string. Furthermore, in response to detecting the movement of the input object, the instructions cause the computing device to determine, based at least in part on a speed of the movement of the input object and a location of the particular position within the substring, whether to include all characters of the substring in a series of selected characters. The series of selected characters further includes all characters of each of the substrings that are completely displayed between the first handle element and the second handle element. In response to detecting the movement of the input object, the instructions also cause the computing device to modify the GUI, based at least in part on the determination, such that the series of selected characters is visually differentiated from characters in the character string that are not in the series of selected characters.

In another example, this disclosure describes a computer readable storage medium that stores instructions that, when executed by one or more processors of a computing device, cause the computing device to output a GUI for display at a display device. The GUI includes a first handle element, a second handle element, and a character string that includes a series of substrings, each of the substrings being a word or number. The instructions also cause the computing device to detect a movement of an input object from a first location on the user interface device to a second location on the user interface device, the first location corresponding to the second handle element, the second location corresponding to a particular position in the character string that is not at a beginning or an end of a substring in the series of substrings. In response to detecting the movement of the input object, the instructions cause the computing device to modify the GUI such that the second handle element indicates the particular position in the character string. In addition, the instructions cause the computing device to determine, based at least in part on a speed of the movement of the input object and a location within the substring of the particular position, whether to include all characters of the substring in a series of selected characters, the series of selected characters further including all characters of each of the substrings that are completely displayed between the first handle element and the second handle element. Furthermore, the instructions cause the computing device to determine, based at least in part on the speed of the movement of the input object and the location within the substring of the particular position, whether to include none of the characters of the substring in the series of selected characters. In addition, the instructions cause the computing device to modify the GUI, based at least in part on the determinations, such that the series of selected characters is visually differentiated from characters in the character string that are not in the series of selected characters.

One or more examples are set forth in the accompanying drawings and the description below. Other features, objects, and advantages will be apparent from the description and drawings, and from the claims.

DETAILED DESCRIPTION

Figure 1A:
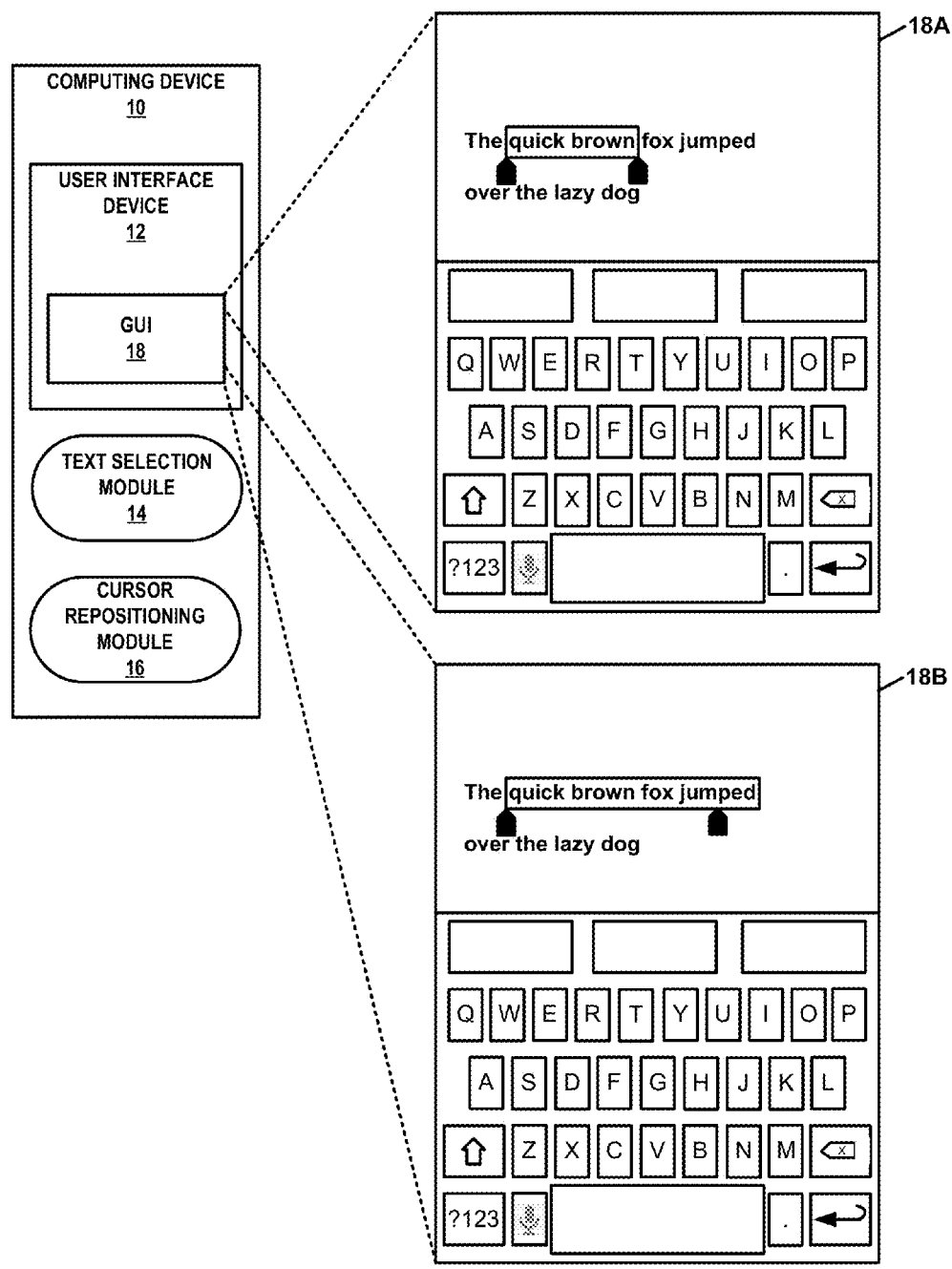
FIG. 1A is a conceptual diagram that illustrates an example computing device in accordance with one or more aspects of the present disclosure to select characters.

In some implementations of the disclosed technology, a computing device may output a graphical user interface (GUI) for display at a display device. The display device may be, for example, a touchscreen device that serves as both a user interface device (configured to receive user inputs, such as touch inputs) and a display device. In some implementations, the user interface device may be "presence-sensitive," e.g., able to detect the presence of an input object when the input object is sufficiently close to the user interface device. Example types of input objects include fingers, styli, and other types of physical objects.

In some implementations, the GUI may include one or more character strings, each of which may include, for example, a series of characters. (Example character types include letters, digits, symbols, punctuation marks, and so on). When a user of the computing device desires to select a particular series of characters within the character string (in order to then instruct the computing device to perform some operation thereon—such as a copy, cut, delete, enlarge, font modification, highlight, color modification, underline, or italicize operation). The computing device may include two handle elements in the GUI output at the display device. The handle elements may correspond to opposite ends of the series of selected characters. The computing device may then be configured to modify the position of one of the handle elements in response to detecting an input object at a location on the user interface device that corresponds to the handle element followed by a movement of the input object to another location on the user interface device. In this disclosure, the computing device may detect a movement of an input object or other user input by receiving an indication of the movement or other user input from an external user interface device or a user interface device integrated into the computing device. In some instances, the computing device may also respond to the movement by including each character between the handle elements in the series of selected characters within the GUI.

In some instances, the selected character string may include a series of words. (Users frequently want to select complete words). However, because a user's fingertip may be large relative to a size of a space between two words, it may be difficult for the user to accurately move the fingertip (along the user interface device) so as to position the fingertip at a space present between the two words. At other times, users want the series of selected characters to include some, but not all, of the characters in an individual word. In accordance with the techniques of this disclosure, if an input object moves to a location on the user interface device that corresponds to a particular position in the character string that is not at a beginning or end of a word, the computing device may determine, based on one or more factors, whether to include all characters of the word in the series of selected characters in the GUI. Based at least in part on this determination, the computing device may modify the GUI to visually differentiate the selected characters from non-selected characters. By performing this determination, the computing device may assist the user in selecting the desired characters.

FIG. 1A is a block diagram that illustrates an example computing device 10 that is configured to implement one or more techniques of this disclosure. Computing device 10 may be various types of computing devices. For example, computing device 10 may be a mobile device, such as a mobile telephone, a tablet computer, a notebook or laptop computer, a personal media player, a portable gaming device, or another type of computing device designed for mobility. In other examples, computing device 10 may be other types of computing devices, such as desktop computers, point of sale devices, televisions, gambling devices, appliances, in-car computers, and other types of computing devices.

In the example of FIG. 1A, computing device 10 includes at least one user interface device 12. User interface device 12 may detect the presence of one or more input objects, such as fingers or styli. In the example of FIG. 1A, user interface device 12 may also display graphical data. Because user interface device 12 may display graphical data and detect the presence of one or more input objects, user interface device 12 may be referred to as a presence-sensitive display device. In other words, user interface device 12 may comprise a display device that displays graphical data. In other examples, computing device 10 may include, or may be communicatively coupled to, a display device and a separate user interface device that detects the presence of one or more input objects. However, for ease of explanation, this disclosure assumes that user interface device 12 both displays graphical data and detects the presence of input objects.

User interface device 12 may be implemented using various technologies. For example, user interface device 12 may be implemented using a resistive touchscreen, a surface acoustic wave touchscreen, a capacitive touchscreen, a projective capacitance touchscreen, an acoustic pulse recognition touchscreen, or another touchscreen technology. In some examples, user interface device 12 may be able to detect the presence of an input object without the input object physically touching user interface device 12. Rather, in some such examples, user interface device 12 may be able to detect the presence of the input object when the input object is sufficiently close to user interface device 12 that user interface device 12 is able to detect the presence of the input object.

User interface device 12 may be operatively coupled to computing device 10 in various ways. For example, user interface device 12 may be integrated into a housing of computing device 10 and be connected to computing device 10 via one or more internal connectors. In another example, user interface device 12 may be external to a housing of computing device 10 and may communicate with computing device 10 via one or more external cables and/or communication networks.

Computing device 10 may output a graphical user interface (GUI) 18 for display at user interface device 12. In general, a GUI may be a type of user interface that allows a user to interact with a computing device with images. GUI 18 may include at least one character string.

GUI 18 may be associated with various applications that execute on computing device 10. For example, GUI 18 may be associated with an email client application. In this example, the character string displayed in GUI 18 may be the contents of an email message that the user has received or an email message that the user is composing. In another example, GUI 18 may be associated with a web browser application. In this example, the character string displayed in GUI 18 may be text within a webpage.

Computing device 10 may detect character selection input. Computing device 10 may detect the character selection input in various ways. For example, computing device 10 may detect the character selection input when computing device 10 detects a tapping gesture at a location on user interface device 12 that displays a word in the character string. In another example, computing device 10 may detect the character selection input when computing device 10 detects a long tap at a location on user interface device 12. A long tap may be a touch that persists at user interface device 12 for longer than a given amount of time (e.g., 1 second) without significant movement across the surface of user interface device 12. If the touch persists for less than the given amount of time, computing device 10 may interpret the touch as a tapping gesture. In another example, computing device 10 may detect the character selection input when computing device 10 detects the activation of a physical button of computing device 10 or detects a tapping gesture at a virtual button displayed at user interface device 12.

Computing device 10 may modify GUI 18 to include a pair of handle elements in response to a character selection input. Each of the handle elements may be a graphical element that is visible in GUI 18. The handle elements may have various appearances. For example, the handle elements may be triangular in shape. In another example, each of the handle elements may be rectangular, but with one clipped corner.

When computing device 10 modifies, in response to a character selection input, GUI 18 to include the handle elements, the handle elements may initially bracket a series of selected characters within the character string. In other words, one of the handle elements may initially be located at one end of the series of selected characters and the other one of the handle elements may initially be located at an opposite end of the series of selected characters.

In different examples, the handle elements may initially bracket various characters within the character string. For example, computing device 10 may detect the character selection input by detecting a tapping gesture at a location on user interface device 12 that displays a particular word in the character string. In this example, the handle elements may bracket the particular word. In another example, computing device 10 may detect a character selection input that includes a double tapping gesture at a location on user interface device 12 that displays a particular sentence within the character string. In this example, the handle elements may bracket the particular sentence. In yet another example, computing device 10 may detect a character selection input that includes a triple tapping gesture at a location on user interface device 12 that displays a particular paragraph within the character string. In this example, the handle elements may initially bracket the particular paragraph.

The selected characters (i.e., the characters in the series of selected characters) may be visually differentiated in user interface device 12 from non-selected characters (i.e., characters in the character string that are not in the series of selected characters). For example, the selected characters may be highlighted with a particular color while non-selected characters are not highlighted. In another example, the selected characters may have a different font color than the non-selected characters. In another example, the selected characters may be underlined, marked in bold, marked in italics, or have other attributes to visually differentiate the selected characters from the non-selected characters. In another example, one or more boxes may surround the series of selected characters.

During a time that GUI 18 displays the handle elements, computing device 10 may detect the presence of an input object at a location on user interface device 12 associated with one of the handle elements. For ease of explanation, this disclosure may refer to this handle element as the active handle element. In this disclosure, the locations associated with an element displayed on user interface device 12 may include the locations on user interface device 12 that display the element. In some instances, the locations associated with an element may also include locations in a region of user interface device 12 that surrounds the element. In such examples, the region may have various sizes. For instance, the region may extend two pixels beyond the pixels that display the element.

While continuing to detect the presence of the input object, computing device 10 may detect a movement of the input object to another location on user interface device 12. For example, computing device 10 may detect that the input object has moved to a location that is to the left, to the right, above, below, or diagonal (relative to user interface device 12) from the location at which computing device 10 initially detected the input object. For ease of explanation, this disclosure may refer to the location to which the input object moved as the destination location of the input object.

In response to detecting the movement of the input object, computing device 10 may determine that the destination location corresponds to a particular position within the character string. For ease of explanation, this disclosure may refer to this particular position as the "relevant position." A position in a character string may be a point that precedes, follows, or is between characters in the character string. In some examples, computing device 10 may determine that the destination location corresponds to the relevant position if the relevant position is the closest position within the character string to the destination location.

In response to determining that the destination location corresponds to the relevant position, computing device 10 may modify GUI 18 such that the active handle element is located on user interface device 12 such that the active handle element indicates the relevant position within the character string. The active handle element may indicate the relevant position within the character string in various ways. For example, the active handle element may comprise a vertical line that passes though the relevant position. In another example, the active handle element may comprise a shape having a pointed end located at the relevant position. In some examples, computing device 10 may animate a movement of the active handle element from its initial position to the relevant position.

The relevant position may be adjacent to a character in a word in the character string. For ease of explanation, this disclosure may refer to this word as the "relevant word." Furthermore, in response to determining that the destination location corresponds to the relevant position, computing device 10 may determine whether the relevant position is at a beginning or end of the relevant word. In other words, computing device 10 may determine whether the relevant position is immediately before the first character or immediately after the last character of the relevant word. In response to determining that the relevant position is at the beginning or end of the relevant word, computing device 10 may include in the series of selected characters all characters of each word that is displayed completely between the active handle element and the other, non-active handle element. A word may be displayed completely between the handle elements if each character of the word is between the handle elements. In some examples, the series of characters may exclude a space character adjacent to the relevant position if the relevant position at the beginning or end of the relevant word.

However, in response to determining that the relevant position is not at a beginning or end of the relevant word, computing device 10 may determine whether to include all characters of the relevant word in the series of selected characters. In response to making the determination to include all characters of the relevant word in the series of selected characters, computing device 10 may include all characters of the relevant word in the series of selected characters. Thus, the series of selected characters may include one or more characters of the relevant word that are not displayed between the handle elements. In addition to the characters of the relevant word, the series of selected characters may include at least all characters of each word completely displayed between the handle elements. In this way, computing device 10 may enable the user to perform word-level selection.

Furthermore, in response to determining that the relevant position is not at a beginning or end of the relevant word, computing device 10 may determine whether to include none of the characters of the relevant word in the series of selected characters. In response to making the determination to include none of the characters of the relevant word in the series of selected characters, computing device 10 may include none of the characters of the relevant word in the series of selected characters. However, the series of selected characters may include at least all characters of each word completely displayed between the handle elements.

If the user previously moved the other, non-active handle element to a position within another word and computing device 10 made the determination to include all characters of the other word in the series of selected characters, the series of selected characters may also include the characters of the other word even though some characters of the other word are not between the handle elements. If the user previously moved the other, non-active handle element to a position within another word and computing device 10 made the determination to include none of characters of the other word in the series of selected characters, the series of selected characters may not include any of the characters of the other word even though some of the characters of the other word are between the handle elements. Thus, at a minimum, the series of selected characters may include at least all characters of each word that is displayed completely between the handle elements.

Furthermore, if computing device 10 does not make the determination to include all of the characters of the relevant word or does not make the determination to include none of the characters of the relevant word in the series of selected characters, computing device 10 may include in the series of selected characters each character of the word that is displayed between the handle elements. For example, if the relevant word is "sunshine" and the active handle element is positioned between the "n" and "s" characters, computing device 10 may include the characters "sun" in the series of selected characters, but not the characters "shine." In this way, computing device 10 may enable the user to perform character-level selection.

Computing device 10 may determine, based on one or more factors, whether to include all of the characters of the relevant word in the series of selected characters. Similarly, computing device 10 may determine, based on one or more factors, whether to include none of the characters of the relevant word in the series of selected characters.

For example, computing device 10 may determine, based at least in part on a speed of the movement of the input object, whether to include all characters of the relevant word. In this example, if the movement of the input object is relatively slow, the user may have time to deliberately move the input object to a precise position within the relevant word. Accordingly, computing device 10 may include some of the characters of the relevant word if a speed of the movement is below a threshold. In this example, if the input object movement was relatively fast, the user is less likely to be able to stop the movement of the input object at the exact desired character. Accordingly, computing device 10 may include all of the characters or none of the characters of the relevant word if a speed of the movement is above a threshold.

For instance, if the active handle element is closer to the start of the character string than the non-active handle element, the speed is above the threshold, and the relevant position is in the earlier half of the relevant word, computing device 10 may include all characters of the relevant word in the series of selected characters. If the active handle element is closer to the start of the character string than the non-active handle element, the speed is above the threshold, and the relevant position is in the latter half of the relevant word, computing device 10 may include none of the characters of the relevant word in the series of selected characters. If the active handle element is closer to the end of the character string than the non-active handle element, the speed is above the threshold, and the relevant position is in the earlier half of the word, computing device 10 may include none of the characters of the relevant word in the series of selected characters. If the active handle element is closer to the end of the character string than the non-active handle element, the speed is above the threshold, and the relevant position is in the latter half of the word, computing device 10 may include all of the characters of the relevant word in the series of selected characters. In this example, the speed of the movement may be an average speed of the movement over the entire course of the movement, a top speed of the movement, an average speed of the movement during a later half of the movement, or another speed associated with the movement.

In another example, computing device 10 may determine, based at least in part of a position within the relevant word of the relevant position, whether to include all characters of the relevant word. In this example, computing device 10 may include in the series of selected characters all characters of the relevant word if the relevant position is in a latter half of the relevant word and the movement of the input object is toward the end of the character string. Conversely, computing device 10 may include in the series of selected characters all characters of the relevant word if the relevant position is in an earlier half of the relevant word and the movement of the input object is toward a start of the character string.

In another example, computing device 10 may determine, based on a direction of the movement of the input object, whether to include in the series of selected characters all characters of the relevant word. In this example, computing device 10 may include all characters of the relevant word in the series of selected characters if the movement corresponds to an increase in the number of characters in the series of selected characters. Conversely, computing device 10 may include some characters of the relevant word in the series of selected characters if the movement corresponds to a decrease in the number of characters in the series of selected characters. In other words, if the direction of the movement corresponds to a decrease in the number of characters in the series of selected characters, computing device 10 may determine that the series of selected characters does not include all of the characters of the word.

In some examples, computing device 10 may determine, based on a combination of multiple factors, whether to include all or none of the characters of the relevant word in the series of selected characters. For example, computing device 10 may generate a weighted score for each the factors, sum the weighted scores, and determine based on whether the sum exceeds a threshold whether to include all characters of the relevant word in the series of selected characters. In this example, computing device 10 may determine based on whether the sum exceeds another threshold whether to include none of the characters of the relevant word in the series of selected characters.

In some examples, computing device 10 may further assist the user in selecting the desired characters by modifying GUI 18 to include a magnification element. In some examples, the magnification element may be rectangular in shape. The magnification element may be located on user interface device 12 above or below the first text. The magnification element may contain an enlarged copy of the relevant word. The enlarged copy of the relevant word may be larger than an initial copy of the relevant word included in the character string. In some examples, the relevant word is the only text displayed in the magnification element.

If one or more characters of the relevant word are in the series of selected characters, the selected characters of the relevant word are visually differentiated in the magnification element from non-selected characters of the relevant word. For example, the selected characters of the relevant word may be highlighted in the enlarged copy of the relevant word in the magnification element and in the initial copy of the relevant word.

Computing device 10 may modify GUI 18 to include the magnification element in response to various events. For example, computing device 10 may modify GUI 18 to include the magnification element in response to determining that a speed of the movement of the input object is below a threshold for at least a particular time duration while the input object is at a region of user interface device 12 associated with the relevant word. Thus, in this example, computing device 10 may modify GUI 18 to include the magnification element if the user is moving the input object in a way that suggests that the user is attempting to deliberately position the input object at a position within the relevant word.

During the time that GUI 18 displays the magnification element, computing device 10 may detect a further movement of the input object within the region of user interface device 12 associated with the relevant word. As computing device 10 detects the further movement, computing device 10 may modify, on a character-by-character basis, which characters of the relevant word are included in the series of selected characters. As computing device 10 modifies which characters of the relevant word are included in the series of selected characters, computing device 10 may modify GUI 18 such that the characters of the relevant word currently in the series of selected characters are indicated in the initial copy of the word and the enlarged copy of the relevant word. Thus, because of the increased size of the relevant word in the magnification element, the magnification element may make it easier for the user to select individual characters within the relevant word on a character-by-character basis. Computing device 10 may remove the magnification element from GUI 18 in response to detecting that the input object has moved to a location on user interface device 12 that is outside the region of user interface device 12 associated with the relevant word.

Furthermore, in some examples, GUI 18 may include a supplemental handle element that is associated with the magnification element. The supplemental handle element may be at a location on user interface device 12 that corresponds to the relevant position in the enlarged copy of the relevant word. For example, the relevant word may be "jumped," the active handle element may be located within GUI 18 immediately after the letter "m" in the initial copy of the relevant word, and the supplemental handle element may be located within GUI 18 immediately after the letter "m" in the enlarged copy of the relevant word.

After detecting a release of the input object from user interface device 12, computing device 10 may detect the same or different input object at a location on user interface device 12 associated with the supplemental handle element. Computing device 10 may detect the release of an input object from user interface device 12 when user interface device 12 is no longer able to detect the presence of the input object. While computing device 10 detects the input object, computing device 10 may detect a movement of the input object to a location on user interface device 12 that corresponds to a particular position in the enlarged copy of the relevant word. In response to detecting the movement, computing device 10 may modify GUI 18 such that the supplemental handle element indicates the particular position in the enlarged copy of the relevant word and the active handle element indicates the particular position in the initial copy of the relevant word. Computing device 10 may include selected characters of the relevant word in the series of selected characters. The selected characters of the relevant word may include characters occurring in the word between the non-active handle element and the particular position.

For example, the relevant word may be "jumped," the active handle element may be located within GUI 18 immediately after the letter "m" in the initial copy of the relevant word, and the supplemental handle element may be located within GUI 18 immediately after the letter "m" in the enlarged copy of the relevant word. In this example, computing device 10 may detect an input object at a location on user interface device 12 associated with the supplemental handle element and then detect a movement of the input object toward a right side of user interface device 12. In response to detecting the movement, computing device 10 may modify GUI 18 such that the active handle element is located immediately after the letter "p" in the initial copy of the relevant word and the supplemental handle element is located immediately after the letter "p" in the enlarged copy of the relevant word. Furthermore, if the non-active handle element is before the active handle element in the character string, computing device 10 may highlight or otherwise visually differentiate the letters "jump" in both the initial and enlarged copies of the relevant word. If the non-active handle element is after the active handle element in the character string, computing device 10 may highlight or otherwise visually differentiate the letters "e" and "d" in both the initial and enlarged copes of the relevant word.

After the desired characters are in the series of selected characters, computing device 10 may detect user input to perform an operation on the series of selected characters. For example, computing device 10 may detect input to copy, cut, delete, enlarge, modify the font or style of, highlight, change the color of, underline, italicize, or perform some other operation on the particular series of selected characters. In some examples, computing device 10 may modify GUI 18 to display virtual buttons or other controls that enable the user to select an operation to perform on the series of selected characters. For example, computing device 10 may modify GUI 18 to include a virtual button labeled "copy" when the user has selected one or more characters within the character string. In this example, computing device 10 may copy the selected characters to a virtual clipboard in response to detecting a tapping gesture at a location on user interface device 12 associated with the virtual button.

While this disclosure refers to words in the character string, the discussion of words in this disclosure may be generally applicable to substrings within the character string, such as numbers, substrings, or other delimited series of characters within the string of characters. Furthermore, in some examples, the substrings within the character string may include semantically-meaningful sub-parts of words. For example, the stem and the suffix of a word may be different substrings within the character string. For instance, in this example, the word "jumped" may include two substrings, "jump" and "ed." Thus, in this example, if an indication of a movement of an input object to a location corresponds to a position between the "m" and "p" of "jumped." computing device 10 may modify GUI 18 such that the series of selected characters includes each character of the substring "jump" and not the characters of the substring "ed." In another example, parts of a compound word separated by a hyphen may be separate substrings. For instance, in this example, the compound word "semantically-meaningful" may include at least two substrings "semantically" and "meaningful." By using semantically-meaningful sub-parts of words as the substrings, it may be easier for the user to edit the character string.

Thus, in accordance with the techniques of this disclosure, computing device 10 may output GUI 18 for display at user interface device 12. GUI 18 may include a first handle element, a second handle element, and a character string that includes a series of substrings, each of the substrings being a word or number. Computing device 10 may detect a movement of an input object from a first location on user interface device 12 to a second location on user interface device 12. The first location may correspond to the second handle element and the second location may correspond to a particular position in the character string that is not at a beginning or an end of a substring in the series of substrings. In response to detecting the movement of the input object, computing device 10 may modify the GUI such that the second handle element indicates the particular position in the character string. In addition, computing device 10 may determine, based on one or more factors (such as a speed of the movement of the input object), whether to include all characters of the substring in a series of selected characters. The series of selected characters may further include all characters of each of the substrings that are completely displayed between the first handle element and the second handle element. Furthermore, in response to detecting the movement of the input object, computing device 10 may modify the GUI, based at least in part on the determination, such that the series of selected characters is visually differentiated from characters in the character string that are not in the series of selected characters.

The example of FIG. 1A includes a GUI configuration 18A and a GUI configuration 18B. GUI configuration 18A and GUI configuration 18B are different configurations of GUI 18. GUI configuration 18A and GUI configuration 18B include the character string "The quick brown fox jumped over the lazy dog." Furthermore, in GUI configuration 18A and GUI configuration 18B, boxes surround selected characters. In GUI configuration 18A, "quick brown" is displayed between handle elements. In GUI configuration 18B, computing device 10 has modified GUI configuration 18A such that the latter handle element indicates a position in the character string between the characters "m" and "p" in the word "jumped." Furthermore, in GUI configuration 18B, computing device 10 has made the determination to include all characters of the word "jumped" in the series of selected characters.

Techniques similar to some of those discussed above for selection of characters may be applied in operations to reposition a cursor within a character string. As described below, computing device 10 may output GUI 18 for display at user interface device 12. GUI 18 may display a text (e.g., a character string). For instance, the text may be the body of an email message or the text of a webpage.

GUI 18 may include a cursor that indicates a first position within the text. While user interface device 12 is displaying GUI 18, computing device 10 may detect a movement of an input point from a location on user interface device 12 associated with the cursor to a location on user interface device 12 that corresponds to a second position within the text. Computing device 10 may then determine whether the second position corresponds to a beginning or end of a word within the text. If the second position corresponds to the beginning or end of the word, computing device 10 may modify GUI 18 such that the cursor indicates the second position.

However, if the second position does not correspond to the beginning or end of the word, computing device 10 may determine, based on one or more factors, whether to modify GUI 18 such that the cursor indicates the second position or indicates a position at the beginning or ending of the word. For example, computing device 10 may determine, based at least in part on a speed of the movement, whether to modify GUI 18 such that the cursor indicates the beginning or ending of the word instead of the second position. For instance, in this example, if a speed of the movement is above a threshold and the second position is in an earlier half of the word, computing device 10 may modify GUI 18 such that the cursor indicates the beginning of the word. If a speed of the movement is above the threshold and the second position is in a latter half of the word, computing device 10 may modify GUI 18 such that the cursor indicates the ending of the word. If the speed is below the threshold, computing device 10 may modify GUI 18 such that the cursor indicates the second position in the text.

In some examples, computing device 10 may detect a cursor repositioning gesture at user interface device 12 while user interface device 12 is displaying GUI 18. Computing device 10 may detect the cursor repositioning gesture in various ways. For example, computing device 10 may detect the cursor repositioning gesture when computing device 10 detects a tapping gesture at a location on user interface device 12 associated with a particular position in the text. In another example, computing device 10 may detect the cursor repositioning gesture when computing device 10 detects a long tap gesture at a location on user interface device 12 associated with a particular position within the text. In these examples, the position within the text may be a closest position within the text to the location on user interface device 12 at which user interface device 12 detected the tapping gesture or long tap gesture.

In response to detecting the cursor repositioning gesture at a location on user interface device 12 that corresponds to a particular location within the text, computing device 10 may modify GUI 18 such that a first cursor indicates the particular position within the first text. For example, the first text may include "the quick brown fox jumped over the lazy dog." In this example, computing device 10 may detect the cursor repositioning gesture at a location on user interface device 12 that corresponds to a location within the first text adjacent to the letter "x." In this example, computing device 10 may, in response to detecting the cursor repositioning gesture, modify GUI 18 such that the first cursor is located on user interface device 12 adjacent to the letter "x."

Furthermore, in response to detecting the cursor repositioning gesture, computing device 10 may modify GUI 18 such that GUI 18 includes a magnification element in addition to the text. In some examples, the magnification element may be rectangular in shape. The magnification element may contain another text. For ease of explanation, the text originally in GUI 18 may be referred to as the first text and the text in the magnification element may be referred to as the second text. The second text may be a copy of a portion of the first text displayed at a larger size than the first text. In other words, the second text may be a series of characters within the first text. In some examples, the second text is a copy of a portion of the first text that is centered at a position in the first text indicated by the first cursor. The second text may include multiple words of the first text. In some examples, the second text is limited to a single line of the first text and the magnification element does not contain portions of the first text other than the second text.

For example, the first text may include "the quick brown fox jumped over the lazy dog." In this example, the magnification element may contain a second text that indicates "own fox jumped over." In this example, the second text "own fox jumped over" may have a larger font size than the first text.

Furthermore, in response to detecting the cursor repositioning gesture, computing device 10 may modify GUI 18 to include a second cursor. In this way, computing device 10 may output, in response to detecting the cursor repositioning gesture, the second text and the second cursor within GUI 18. The second cursor may indicate a position within the second text that corresponds to the position within the first text indicated by the first cursor. For example, the first text may include "the quick brown fox jumped over the lazy dog." In this example, the magnification element may contain a second text that specifies "own fox jumped over." Furthermore, in this example, the cursor repositioning gesture may indicate a position within the first text adjacent to the letter "x." Accordingly, in this example, the second cursor may be located on user interface device 12 adjacent to the copy in the second text of the letter "x." In some examples, computing device 10 may select the second text such that the position within the second text indicated by the second cursor is approximately at a middle of the second text.

In some examples, a position in the first text may correspond to a position in the second text if the number of characters occurring in the first text before the position in the first text is equal to the number of characters occurring the first text before a starting character of the second text plus the number of characters occurring in the second text before the position within the second text. For instance, the second text may be a copy of a portion of the first text that starts after a $10^{th}$ character of the first text. A position in the first text that follows the $12^{th}$ character of the first text may correspond to a position following the second character of the second text $(12=10+2)$.

The first cursor and the second cursor may have various appearances. For example, the first cursor and the second cursor may be rectangular shapes with triangles attached to their upper ends. In another example, the first cursor and the second cursor may be vertical lines. In this example, small circles may be connected to the upper and/or lower ends of the vertical lines. Alternatively, in this example, small horizontal lines may be connected to the upper and/or lower ends of the vertical lines. In some examples, the first cursor may have different appearances depending on whether the first cursor is at an end of the first text or within the first text. Similarly, the second cursor may have different appearances depending on whether the second cursor is at an end of the first text or within the first text.

If the first cursor indicates a desired location within the first text, computing device 10 may edit, in response to user input, the first text at the location indicated by the first cursor. For example, computing device 10 may insert, in response to user input, a character into the first text at a position currently indicated by the first cursor. In another example, computing device 10 may delete, in response to a user input, a character from the first text at the position currently indicated by the first cursor. In some examples, computing device 10 may hide the second cursor and the magnification element in response to detecting user input to edit the first text.

While GUI 18 displays the first cursor, the magnification element, and the second cursor, computing device 10 may detect a movement of an input object from a first location (e.g., a starting location) on user interface device 12 to a second location (e.g., an ending location) on user interface device 12. If the first cursor is located at a first position in the first text, the starting location of the movement is within a region of user interface device 12 that is associated with the first cursor, and the ending location of the movement corresponds to a second position within the first text, computing device 10 may modify GUI 18 such that the first cursor indicates the second position within the first text. Computing device 10 may animate a movement of the first cursor from the first position within the first text to the second position within the first text. In this way, it may appear to the user that the input object is dragging the first cursor.

In addition to modifying the location of the first cursor, computing device 10 may modify GUI 18 such that the second cursor indicates a position within the second text that corresponds to the second position within the first text. Computing device 10 may animate a movement of the second cursor to the position within the second text that corresponds to the second position within the first text. For instance, computing device 10 may animate, in response to the movement of the input object from a second location on user interface device 12 to a third location on user interface device 12, a movement of the second cursor from a second location on user interface device 12 to the third location on user interface device 12.

For example, the first text may include "the quick brown fox jumped over the lazy dog" and the second text may include "own fox jumped over." In this example, the first cursor may be located immediately to the left of the letter "x" in the first text and the second cursor may be located immediately to the left of the letter "x" in the second text. Furthermore, in this example, the starting location of the movement may be within a region of user interface device 12 associated with the first cursor and the ending location of the movement may be within a region of user interface device 12 associated with the letter "v" in the first text. Hence, in this example, computing device 10 may modify GUI 18 such that the first cursor is located adjacent to the letter "v" in the first text and the second cursor is located adjacent to the letter "v" in the second text.

Computing device 10 may modify the magnification element, if needed, such that the text in the magnification element includes the position within the first text indicated by the first cursor. For instance, if the first cursor indicates a first position within the first text, computing device 10 detects that the input object has moved to a location on user interface device 12 that corresponds to a second position within the first text, and the second position within the first text does not correspond to a position within the second text, computing device 10 may modify GUI 18 such that the magnification element includes a third text instead of the second text. The third text may be a copy of a portion of the first text that includes the second position within the first text. The third text may be displayed larger than the first text. In some examples, the third text may be a copy of a portion of the first text that is centered on the second position within the first text. In other words, the mid-point of the third text may generally correspond to the second position within the first text.

For example, the first text may include "the quick brown fox jumped over the lazy dog" and the second text may be "own fox jumped over." In this example, computing device 10 may detect that the input object has moved to a location on user interface device 12 that is adjacent to the character "z" in the first text. In response, computing device 10 may modify the magnification element to include the text "over the lazy dog" instead of the text "own fox jumped over."

Computing device 10 may also detect an input object at a location on user interface device 12 that is associated with the second cursor. Computing device 10 may then detect a movement of the input object from the location (e.g., the starting location of the movement) to another location on user interface device 12 (e.g., the ending location of the movement). In response to detecting this movement of the input object, computing device 10 may modify GUI 18 such that the second cursor is located on user interface device 12 such that the second cursor indicates a second position within the second text. The second position within the second text may be a position within the second text that is closest to the ending location of the movement. Computing device 10 may animate a movement of the second cursor to the second position within the second text. In this way, it may appear to the user that the input object is dragging the second cursor. Furthermore, in response to detecting the movement, computing device 10 may modify the position of the first cursor such that the first cursor indicates a second position within the first text instead of a first position within the first text. The second position within the first text may correspond to the second position within the second text.

For example, the first text may include "the quick brown fox jumped over the lazy dog" and the second text may include "own fox jumped over." In this example, the second cursor may indicate a position within the second text immediately to the left of the letter "x" and the first cursor may indicate a position within the first text immediately to the left of the letter "x" in the first text. Furthermore, in this example, computing device 10 may detect the input object at a location on user interface device 12 associated with the second cursor and detect a movement of the input object to a location on user interface device 12 that corresponds to a position adjacent to the letter "v" in the second text. Hence, in this example, computing device 10 may modify GUI 18 such that the second cursor indicates the position within the second text adjacent to the letter "v" and the first cursor indicates a position within the first text adjacent to the letter "v."

Because the characters in the second text are larger than the characters in the first text, the movement to drag the second cursor from a first position adjacent to a first character in the second text to a position adjacent to a second character in the second text may be larger than an equivalent movement to drag the first cursor from a position adjacent to the first character in the first text to the second character in the second text. Accordingly, it may be easier for the user to reposition the first cursor by repositioning the second cursor than by repositioning the first cursor directly.

In some examples, computing device 10 may output, during detection of the movement of the input object, the first and second cursors at respective updated locations on user interface device 12 such that the first and second cursors track the movement of the input object. For example, if computing device 10 detects an input object at a location on user interface device 12 associated with the second cursor and detects a leftward or rightward movement of the input object, computing device 10 may update GUI 18 such that the first and second cursors respectively indicate positions within the first and second texts that correspond to the locations on user interface device 12 at which computing device 10 currently detects the input object.

After computing device 10 detects a movement of an input object on user interface device 12, computing device 10 may detect a release of the input object from user interface device 12. Computing device 10 may detect a release of the input object from user interface device 12 when user interface device 12 is no longer able to detect the presence of the input object. Computing device 10 may continue to include the magnification element and the second cursor in GUI 18 after computing device 10 detects the release of the input object from user interface device 12 and until computing device 10 detects an additional user input at user interface device 12. For example, computing device 10 may modify GUI 18 in response to user input to edit the first text such that GUI 18 no longer includes the magnification element and the second cursor. In another example, computing device 10 may, in response to detecting a touch at a location on user interface device 12 that is not associated with the first cursor or the second cursor, modify GUI 18 such that GUI 18 no longer includes the magnification element and the second cursor. Continuing to include the magnification element and the second cursor until computing device 10 detects additional user input may enable the user to release the input object from user interface device 12 and then touch the location on user interface device 12 associated with the second cursor without the second cursor disappearing.

Thus, in accordance with the techniques of this disclosure, computing device 10 may output GUI 18 for display at a display device, such as user interface device 12. GUI 18 may include a first text and a second text. The second text may be a copy of a portion of the first text displayed at a larger size than the first text. GUI 18 may further include a first cursor and a second cursor, the first cursor being at a first location of the presence-sensitive display and the second cursor being at a second location of the presence-sensitive display. The first cursor may indicate a first position within the first text and the second cursor may indicate a first position within the second text. The first position within the second text may correspond to the first position within the first text. Computing device 10 may detect a movement of an input object from the second location on the presence-sensitive display to a third location on the presence-sensitive display. The third location may correspond to a different, second position within the second text. Furthermore, computing device 10 may output, in response to detecting the movement, the first and second cursors such that the second cursor indicates the second position within the second text and the first cursor indicates a second position within the first text, the second position within the first text corresponding to the second position within the first text. Computing device 10 may insert, in response to user input, a character into the first text at a position currently indicated by the first cursor.

In some instances, the movement of the input object is a first movement of the input object, and computing device 10 may detect a second movement of the input object from a fourth location on user interface device 12 to a fifth location on user interface device 12. The fourth location may correspond to the first cursor and the fifth location may correspond to a different, third position within the first text. Computing device 10 may output, in response to detecting the second movement of the input object, the first and second cursors such that the first cursor indicates the third position within the first text and the second cursor indicates a third position within the second text. The third position within the second text may correspond to the third position within the first text.

In the example of FIG. 1A, computing device 10 includes a text selection module 14 and a cursor selection module 16. Text selection module 14 and cursor selection module 16 may be subsets of instructions stored at computing device 10. Execution of the instructions in text selection module 14 may cause or configure computing device 10 to perform the text selection techniques of this disclosure. Execution of the instructions in cursor repositioning module 16 may configure computing device 10 to perform the cursor repositioning techniques of this disclosure. In some examples, the instructions to select text or reposition cursors in accordance with the techniques of this disclosure may not be packaged into discrete modules, but may be distributed among several modules. In other examples, the functionality provided by executing the instructions of text selection module 14 and/or cursor repositioning module 16 may be implemented using one or more hardware modules.

Figure 1B:
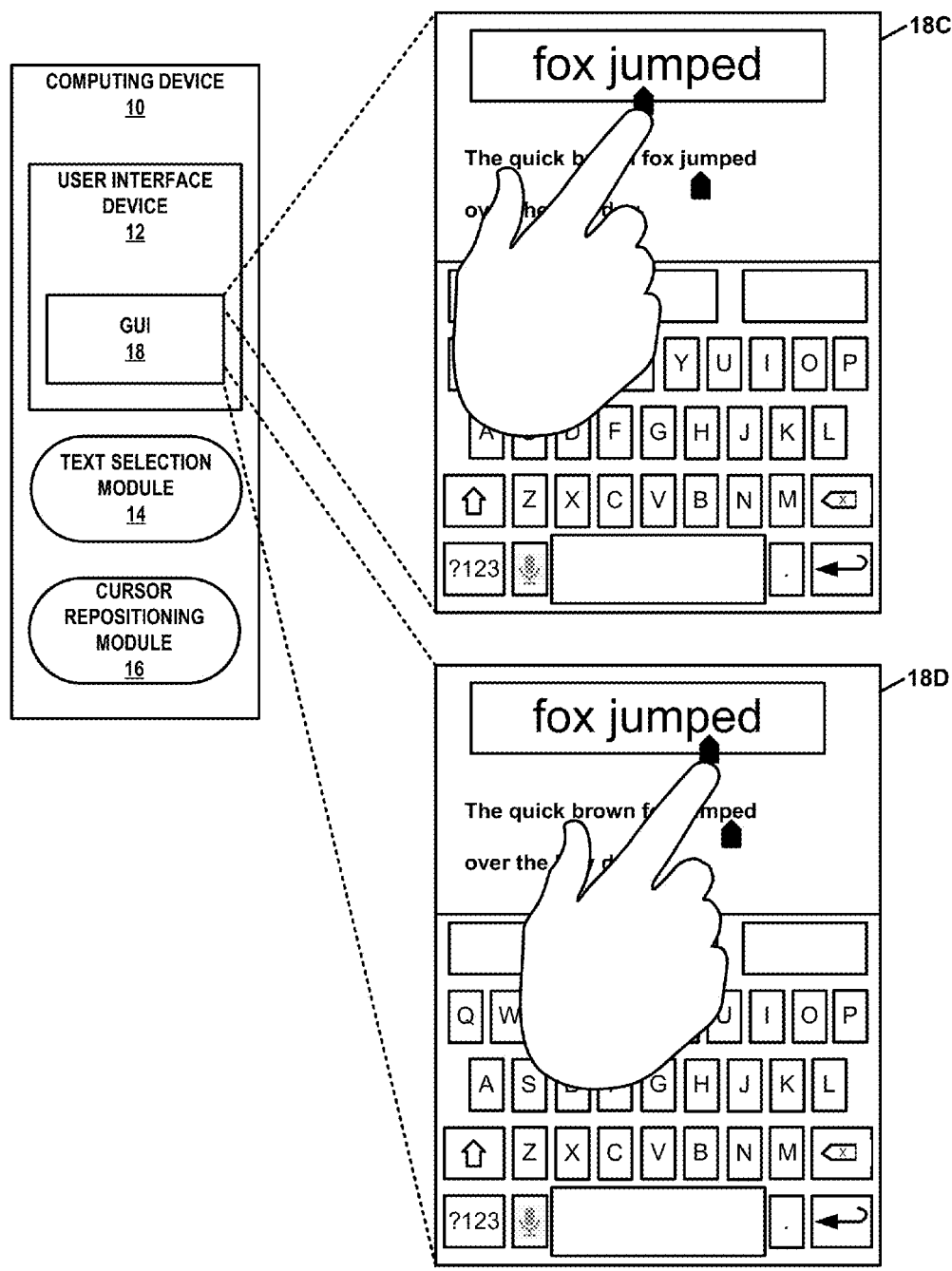
FIG. 1B is a conceptual diagram that illustrates an example computing device in accordance with one or more aspects of the present disclosure to reposition a cursor.

FIG. 1B is a conceptual diagram that illustrates an example computing device, in accordance with one or more aspects of the present disclosure to reposition a cursor. The example of FIG. 1B includes a GUI configuration 18C and a GUI configuration 18C. GUI configuration 18C and GUI configuration 18C are different configurations of GUI 18. GUI configuration 18C and GUI configuration 18D include the first text "The quick brown fox jumped over the lazy dog" and a magnification element that includes the second text "fox jumped." In GUI configuration 18C, a first cursor indicates a position in the first text between the characters "u" and "m" in the word "jumped" and a second cursor indicates a position in the second text between the characters "u" and "m" in the word "jumped." In the example of FIG. 1B, computing device 10 may detect a movement of an input object from a location associated with the second cursor to a location on user interface device 10 that is closest to a position in the second text between the characters "p" and "e." Accordingly, as shown in GUI configuration 18D, computing device 10 modified GUI configuration 18C such that the second cursor indicates a position in the second text between the characters "p" and "e." In addition, computing device 10 modified GUI configuration 18C such that the first cursor indicates a position in the first text between the characters "p" and "e."

Figure 2:
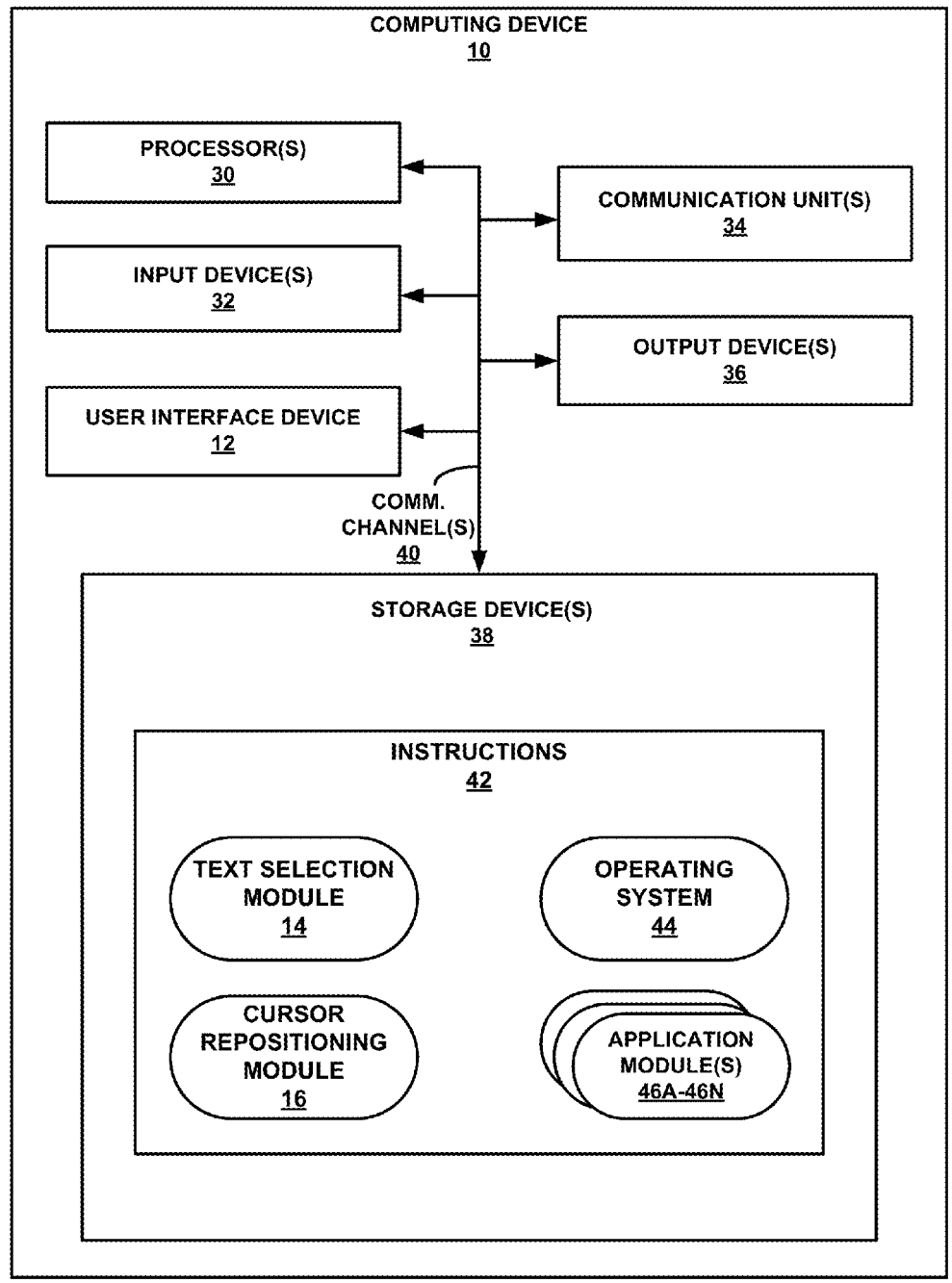
FIG. 2 is a block diagram illustrating an example computing device, in accordance with one or more aspects of the present disclosure.

FIG. 2 is a block diagram illustrating an example configuration of computing device 10. For purposes of illustration, FIG. 2 is described with reference to FIGS. 1A-1B. FIG. 2 illustrates only one particular example of computing device 10, and many other example configurations of computing device 10 exist.

As shown in the example of FIG. 2, computing device 10 includes one or more processors 30, one or more input devices 32, one or more communication units 34, one or more output devices 36, one or more storage devices 38, one or more communication channels 40, and user interface device 12. Computing device 10 may include many other components. For example, computing device 10 may include physical buttons, microphones, speakers, communication ports, and so on.

Communication channels 40 may interconnect each of the components 30, 32, 34, 36, 38, and 12 for inter-component communications (physically, communicatively, and/or operatively). In some examples, communication channels 40 may include a system bus, a network connection, an inter-process communication data structure, or any other method for communicating data.

One or more storage devices 38 within computing device 10 may store information required for use during operation of computing device 10. Storage devices 38, in some examples, have the primary purpose of being a short term and not a long-term computer-readable storage medium. Storage devices 38 on computing device 10 may be volatile memory and therefore not retain stored contents if powered off. Examples of volatile memories include random access memories (RAM), dynamic random access memories (DRAM), static random access memories (SRAM), and other forms of volatile memories known in the art. Storage devices 38 may further be configured for long-term storage of information as non-volatile memory space and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories. In some examples, processors 30 on computing device 10 read and execute instructions 42 stored by storage devices 38.

Computing device 10 may include one or more input devices 32 that computing device 10 uses to receive input. Examples of input are tactile, audio, and video input. Input devices 32 of computing device 10, in one example, includes a presence-sensitive screen, touch-sensitive screen, mouse, keyboard, voice responsive system, video camera, microphone or any other type of device for detecting input from a human or machine.

Communication units 34 may enable computing device 10 to send data on and receive data from a communications network, such as a local area network or the Internet. In some examples, communication units 34 may include wireless transmitters and receivers that enable computing device 10 to communicate wirelessly with the communications network.

Output devices 36 may generate output. Examples of output are tactile, audio, and video output. Output devices 36 may include presence-sensitive screens, sound cards, video graphics adapter cards, speakers, cathode ray tube (CRT) monitors, liquid crystal displays (LCD), or other types of devices for generating output.

Storage devices 38 may store data, such as computer-executable instructions 42. Storage devices 38 may be implemented using one or more volatile or non-volatile computer-readable storage media. Processors 30 may read instructions 42 from storage devices 38 and execute instructions 42. Execution of instructions 42 by processors 30 may configure or cause computing device 10 to provide at least some of the functionality ascribed in this disclosure to computing device 10. As shown in the example of FIG. 2, instructions 42 include operating system 44, and application modules 46A-46N (collectively, "application modules 46"). Execution of instructions in operating system 44 may cause computing device 10 to perform various functions to manage hardware resources of computing device 10 and to provide various common services for other computer programs. Execution of instructions in application modules 46 may cause computing device 10 to provide various applications (e.g., "apps").

Furthermore, instructions 42 include text selection module 14 and cursor repositioning module 16. Text selection module 14 may cause computing device 10 to detect a movement of an input object on user interface device 12. The movement may start at a location on user interface device 12 that is associated with a particular handle element. The movement may end at a location on user interface device 12 that corresponds to a particular position in the character string. In response to detecting the movement, text selection module 14 may reposition the particular handle element on GUI 18 such that the particular handle element indicates the particular position in the character string. Furthermore, text selection module 14 may modify GUI 18 such that a series of selected characters includes all characters of each of the substrings that are completely displayed between the repositioned particular handle element and the other handle element. In addition, if the particular position in the character string is not at a beginning or an end of a substring in the series of substrings, text selection module 14 may determine, based at least in part on a speed of the movement (or other factors), whether to include all characters of the substring in the series of selected characters. Text selection module 14 may modify GUI 18, based at least in part on the determination, such that the selected characters are visually differentiated from the non-selected characters in the character string.

Cursor repositioning module 16 may detect an input object at a location on user interface device 12 associated with a magnified text cursor. The magnified text cursor may indicate a position in a magnified text. The magnified text may be a substring within a non-magnified text displayed on user interface device 12. Cursor repositioning module 16 may then detect a movement of the input object to another location on user interface device 12. The other location may correspond to another position in the magnified text. In response to detecting the movement, cursor repositioning module 16 may reposition the cursor such that the cursor indicates the other position in the magnified text. Furthermore, in response to detecting the movement, cursor repositioning module 16 may reposition another cursor such that the other cursor indicates a position in the non-magnified text that is between the same two characters as the magnified text cursor.

Figure 3:
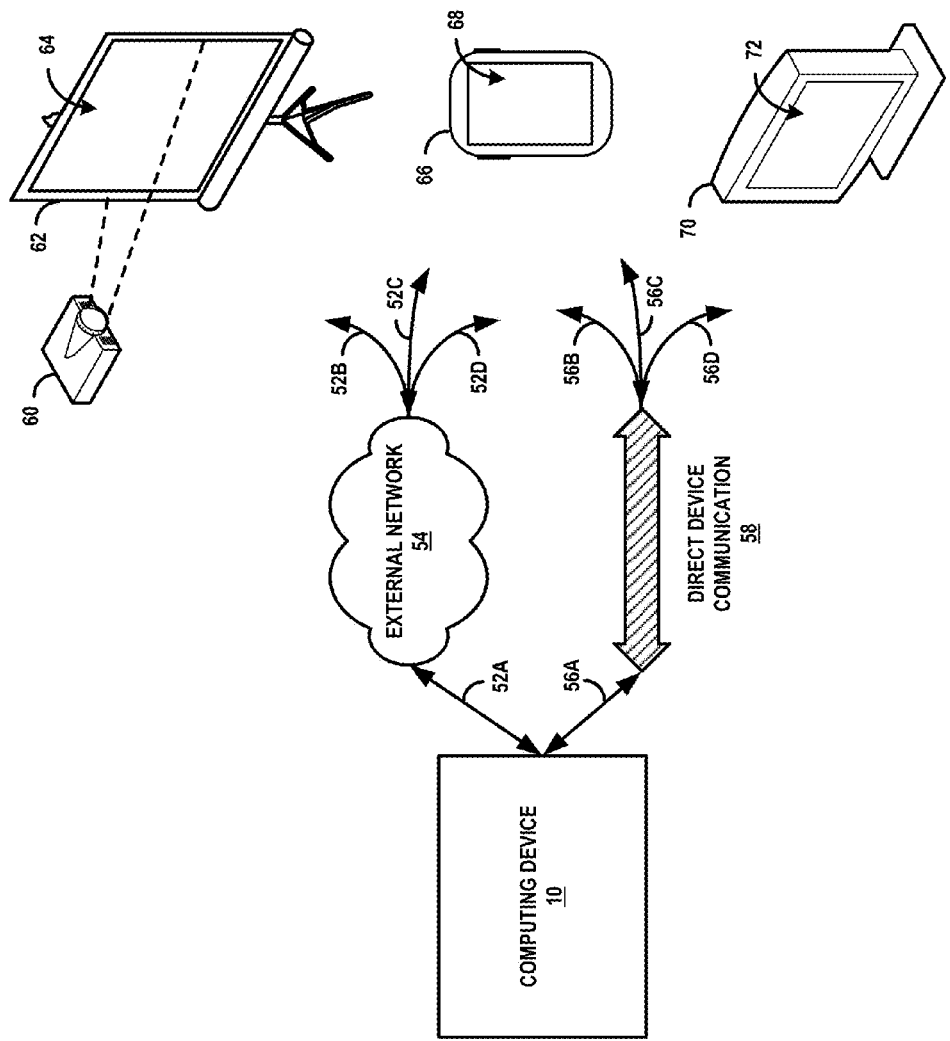
FIG. 3 is a block diagram illustrating an example in which a computing device outputs graphical content for display at a remote display device, in accordance with one or more aspects of the present disclosure.

FIG. 3 is a block diagram illustrating an example in which computing device 10 outputs graphical content for display at a remote display device, in accordance with one or more techniques of the present disclosure. Graphical content, generally, may include any visual information that may be output for display, such as text, images, a group of moving images, etc. Although shown for purposes of example in FIGS. 1 and 2 as a stand-alone computing device, computing device 10 may be a component or system that is or includes a processor or other suitable computing environment for executing software instructions and, for example, need not include a presence-sensitive display. Computing device 2 may include one or more processors (e.g., one or more microprocessor or other types of integrated circuits), a smartphone, a tablet computer, a personal computer, or another type of computing device that is configured to perform one or more techniques of this disclosure.

The example of FIG. 3 includes a projector 60 and a projection screen 62. Other such examples of projection devices may include electronic whiteboards, holographic display devices, and any other suitable devices for displaying graphical content. Projector 60 and projection screen 62 may include one or more communication units that enable the respective devices to communicate with computing device 10. In some examples, projector 60 and projection screen 62 may be configured to communicate with each other. Projector 60 may receive data from computing device 10 that includes graphical content. Projector 60 may, in response to receiving the data, project the graphical content onto projection screen 62. In some examples, projector 60 may determine one or more user inputs (e.g., continuous gestures, multi-touch gestures, single-touch gestures, etc.) at projector screen using optical recognition or other suitable techniques and send indications of such user input using one or more communication units to computing device 10.

In some examples, projection screen 62 may include a presence-sensitive display 64. Presence-sensitive display 64 may include a subset of functionality or all of the functionality of UI device 4 as described in this disclosure. In some examples, presence-sensitive display 64 may include additional functionality. Projection screen 62 (e.g., an electronic whiteboard), may receive data from computing device 10 and display the graphical content. In some examples, presence-sensitive display 64 may determine one or more user inputs (e.g., continuous gestures, multi-touch gestures, single-touch gestures, etc.) at projection screen 62 using capacitive, inductive, and/or optical recognition techniques and send indications of such user input using one or more communication units to computing device 10.

The example of FIG. 3 also illustrates a mobile device 66 and a display device 70. Mobile device 66 and display device 70 may each include computing and connectivity capabilities. Examples of mobile device 66 may include e-reader devices, convertible notebook devices, hybrid slate devices, mobile telephones, personal media players, remote controller devices, wearable computing devices, etc. Examples of display device 70 may include televisions, computer monitors, etc. As shown in the example of FIG. 3, mobile device 66 may include a presence-sensitive display 68. Display device 70 may include a presence-sensitive display 72. Presence-sensitive displays 68, 72 may include a subset of functionality or all of the functionality of UI device 4 as described in this disclosure. In some examples, presence-sensitive displays 68, 72 may include additional functionality. In any case, presence-sensitive display 72, for example, may receive data from computing device 10 and display the graphical content. In some examples, presence-sensitive display 72 may determine one or more user inputs (e.g., continuous gestures, multi-touch gestures, single-touch gestures, etc.) at presence-sensitive display 72 using capacitive, inductive, and/or optical recognition techniques and send indications of such user input using one or more communication units to computing device 10.

In some examples, computing device 10 may output graphical content for display at one or more remote devices, such as projector 60, projection screen 62, mobile device 66, and display device 70. For instance, computing device 10 may execute one or more instructions to generate and/or modify graphical content in accordance with techniques of the present disclosure. Computing device 2 may output the data that includes the graphical content to a communication unit of computing device 10. Computing device 2 may send the data to one or more of the remote devices, such as projector 60, projection screen 62, mobile device 66, and/or display device 70. In this way, computing device 2 may output the graphical content for display at one or more of the remote devices. In some examples, one or more of the remote devices may output the graphical content at a presence-sensitive display that is included in and/or operatively coupled to the respective remote devices.

Computing device 2 may send and receive data using various communication techniques. For example, computing device 10 may be operatively coupled to external network 54 using network link 52A. Each of the remote devices illustrated in the example of FIG. 3 may be operatively coupled to network external network 54 by one of respective network links 52B, 52C, and 52D. External network 54 may include network hubs, network switches, network routers, etc., that are operatively inter-coupled, thereby providing for the exchange of information between computing device 10 and the remote devices illustrated in the example of FIG. 3. In some examples, network links 52A-52D may be Ethernet, asynchronous transfer mode (ATM) or other network connections. Such connections may be wireless and/or wired connections.

In some examples, computing device 10 may be operatively coupled to one or more of the remote devices included in the example of FIG. 3 using direct device communication 58. Direct device communication 58 may include communications through which computing device 10 sends and receives data directly with a remote device, using wired or wireless communication. That is, in some examples of direct device communication 58, data sent by computing device 10 may not be forwarded by one or more additional devices before being received at the remote device, and vice-versa. Examples of direct device communication 58 may include Bluetooth, Near-Field Communication, Universal Serial Bus, WiFi, infrared, etc. One or more of the remote devices illustrated in the example of FIG. 3 may be operatively coupled with computing device 10 by communication links 56A-56D. In some examples, communication links 52A-52D may be connections using Bluetooth, Near-Field Communication, Universal Serial Bus, infrared, etc. Such connections may be wireless and/or wired connections.

Figure 4:
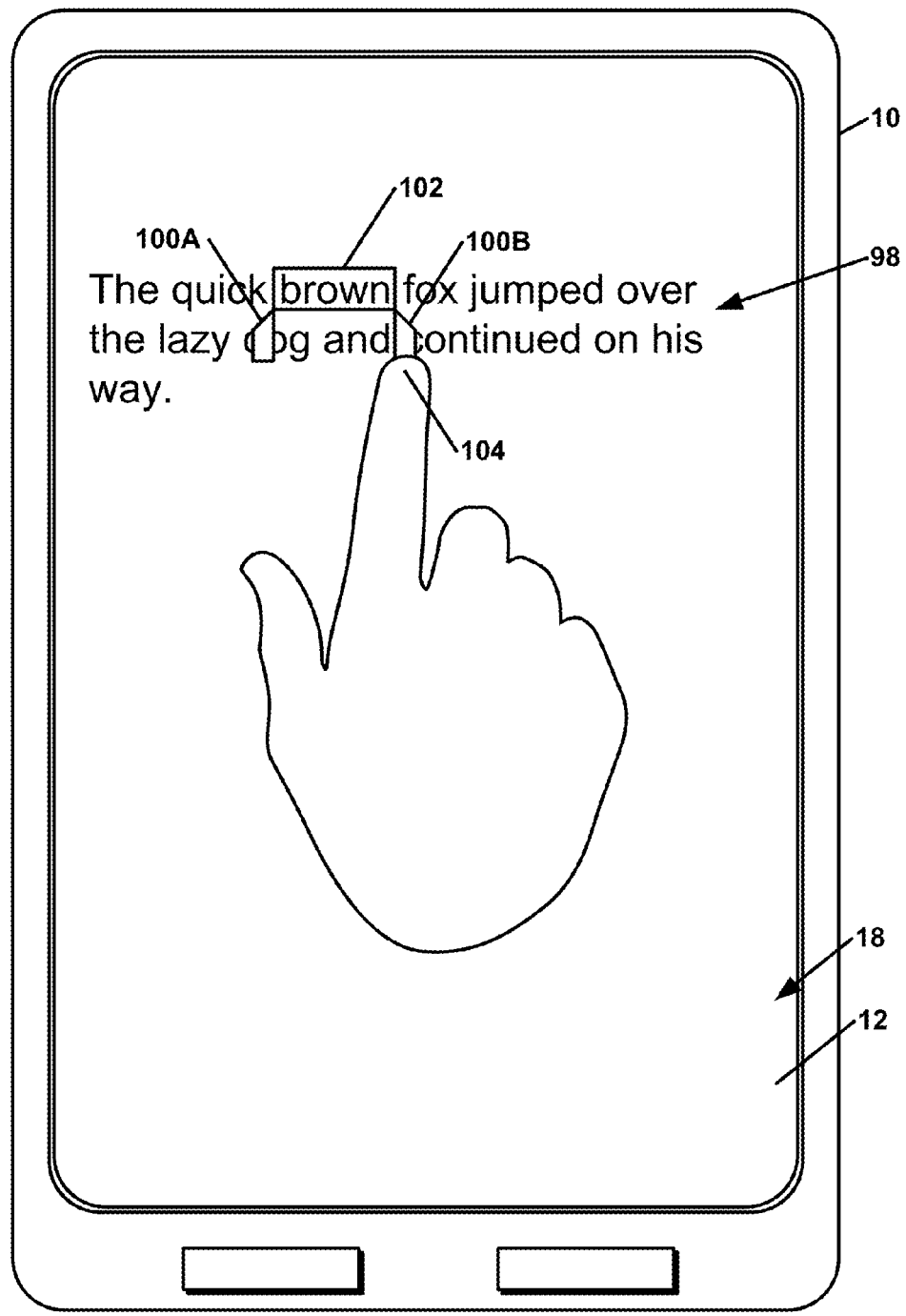
FIG. 4 is a conceptual diagram that illustrates an example GUI displayed by a user interface device of a computing device.

FIG. 4 is a conceptual diagram that illustrates an example GUI displayed by user interface device 12 of computing device 10. In the example of FIG. 4, computing device 10 outputs GUI 18 for display at user interface device 12. In the example of FIG. 4 and the following figures, computing device 10 is shown as a tablet computer or a smartphone. It will be understood that computing device 10 may be other types of devices.

GUI 18 includes a character string 98. In the example of FIG. 4, character string 98 indicates "The quick brown fox jumped over the lazy dog and continued on his way." In addition, GUI 18 includes handle elements 100A and 100B (collectively, "handle elements 100"). Furthermore, in the example of FIG. 4, a box 102 visually differentiates the selected characters of character string 98 from non-selected characters of character string 98. The example of FIG. 4 also shows a fingertip 104 touching user interface device 12 at a location associated with handle element 100B.

Figure 5:
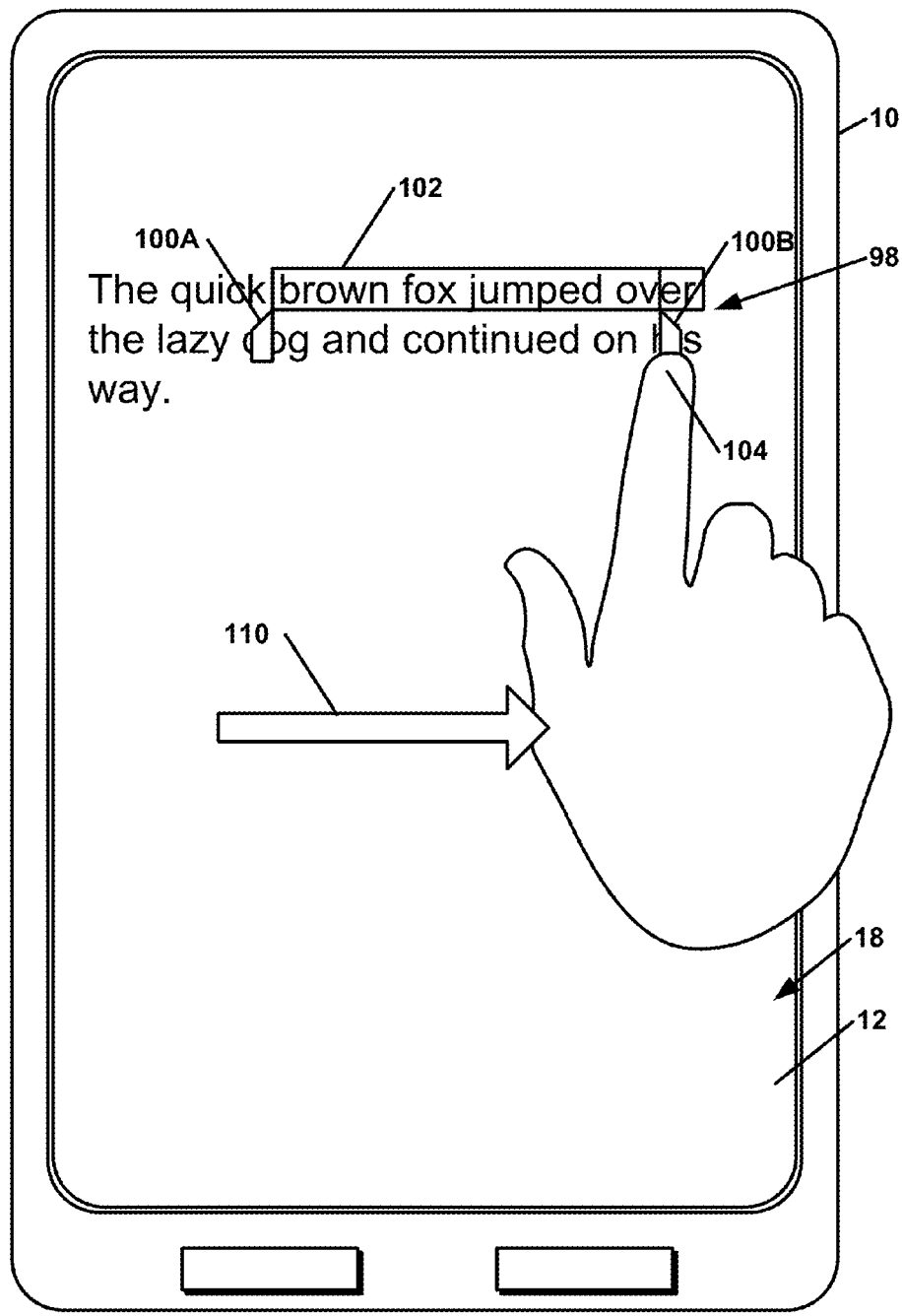
FIG. 5 is a conceptual diagram that illustrates an example configuration of the GUI of FIG. 4 after the computing device detects a sliding movement that originates at a location on the user interface device that corresponds to a second handle element.

FIG. 5 is a conceptual diagram that illustrates an example configuration of GUI 18 of FIG. 4 after computing device 10 detects a sliding movement that originates at a location on user interface device 12 that corresponds to handle element 100B. As illustrated in the example of FIG. 5, a user has moved fingertip 104 rightward across user interface device 12 as shown by arrow 110. In response to detecting the movement of fingertip 104, computing device 10 has modified GUI 18 such that handle element 100B is at a location on user interface device 12 that corresponds to a destination location of the movement of fingertip 104.

In the example of FIG. 5, computing device 10 has modified GUI 18 such that handle element 100B is located between the letters "v" and "e" in the word "over." However, as shown in the example of FIG. 5, computing device 10 has made the determination to include all characters of the word "over" in the series of selected characters. Accordingly, computing device 10 has modified GUI 18 such that box 102 encompasses all characters of the word "over" and all characters of each complete word between handle element 100A and handle element 100B.

Figure 6:
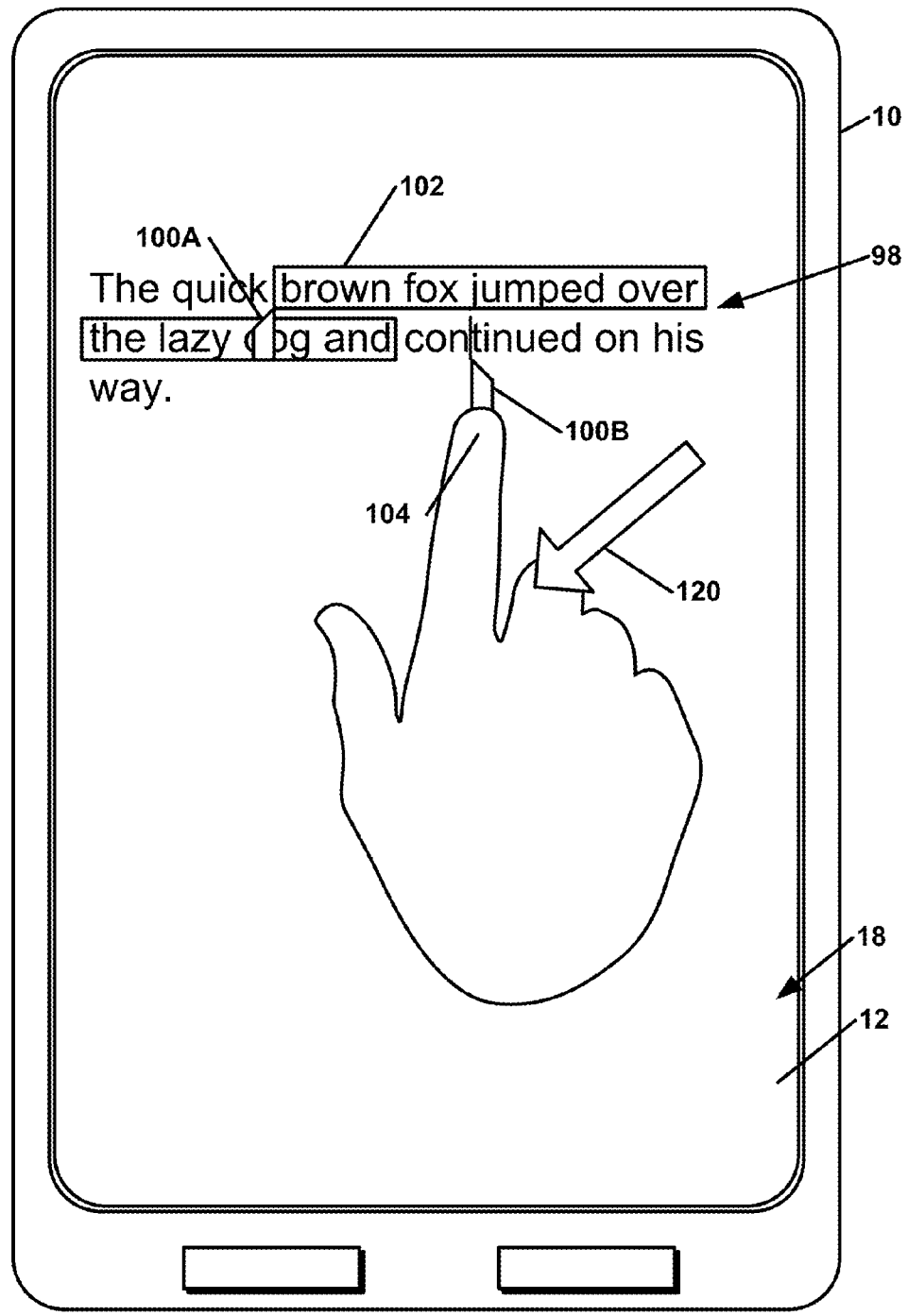
FIG. 6 is a conceptual diagram that illustrates an example configuration of the GUI of FIG. 4 after the computing device detects a further sliding movement that originates at a location on the user interface device that corresponds to the second handle element.

FIG. 6 is a conceptual diagram that illustrates an example configuration of GUI 18 of FIG. 5 after computing device 10 detects a further sliding movement that originates at a location on user interface device 12 that corresponds to handle element 100B. As illustrated in the example of FIG. 6, the user has moved fingertip 104 downward and to the left as shown by arrow 120. In response to detecting the movement of fingertip 104, computing device 10 has modified GUI 18 such that handle element 100B is at a location on user interface device 12 that corresponds to a destination location of the movement of fingertip 104.

In the example of FIG. 6, computing device 10 has modified GUI 18 such that handle element 100B is between the letters "n" and "t" in the word "continued." However, as shown in the example of FIG. 6, computing device 10 has made the determination to include none of the characters of the word "continued" in the series of selected characters. Accordingly, computing device 10 has modified GUI 18 such that box 102 encompasses all characters of each complete word between handle element 100A and handle element 100B, but none of the characters of the word "continued."

Figure 7:
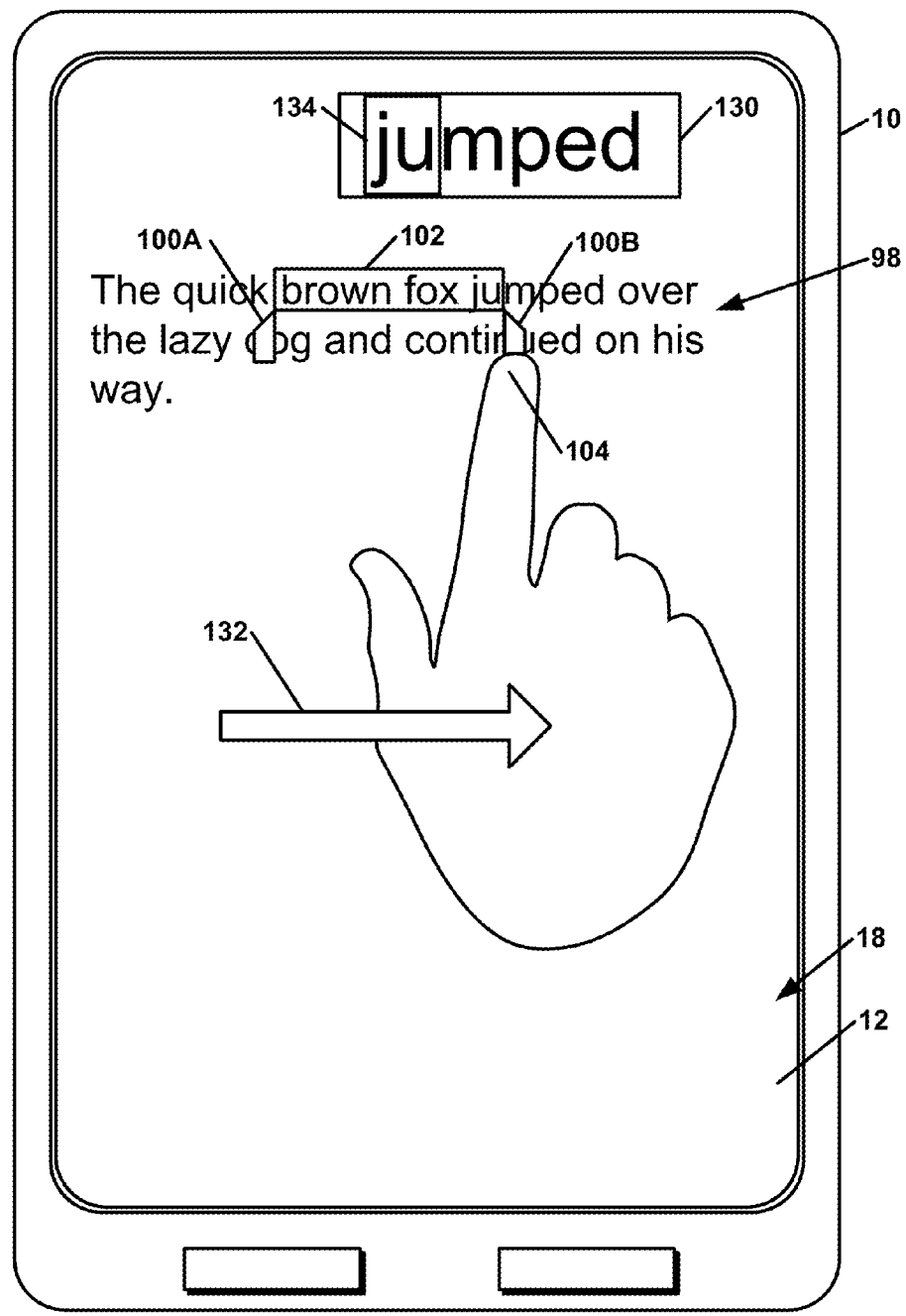
FIG. 7 is a conceptual diagram that illustrates an example configuration of a GUI that includes a magnification element.

FIG. 7 is a conceptual diagram that illustrates an example configuration of GUI 18 in which GUI 18 includes a magnification element 130. As shown by arrow 132 in the example of FIG. 7, the user has moved fingertip 104 rightward from a location on user interface device 12 associated with an original location of handle element 100B. In response to detecting the movement of fingertip 104, computing device 10 has modified GUI 18 such that handle element 10B is at a location on user interface device 12 that corresponds to a destination location of the movement of fingertip 104.

In the example of FIG. 7, computing device 10 has modified GUI 18 such that handle element 100B is within the word "jumped." In particular, handle element 100B is located between the letters "u" and "m" in the word "jumped." As shown in the example of FIG. 7, computing device 10 has made the determination to include some of the characters of the word "jumped" in the series of selected characters. Accordingly, box 102 encompasses each complete word between handle element 100A and handle element 100B plus the characters of the word "jumped" between handle elements 100.

Furthermore, in response to detecting the movement of fingertip 104, computing device 10 has modified GUI 18 to include magnification element 130. Because handle element 100B is located within the word "jumped," magnification element 130 includes the word "jumped." As shown in the example of FIG. 7, the word "jumped" is displayed in magnification element 130 at a size larger than the size of the word jumped in character string 98. Magnification element 130 includes a box 134 to visually differentiate characters of the word "jumped" that are in the series of selected characters from non-selected characters of word "jumped."

Figure 8:
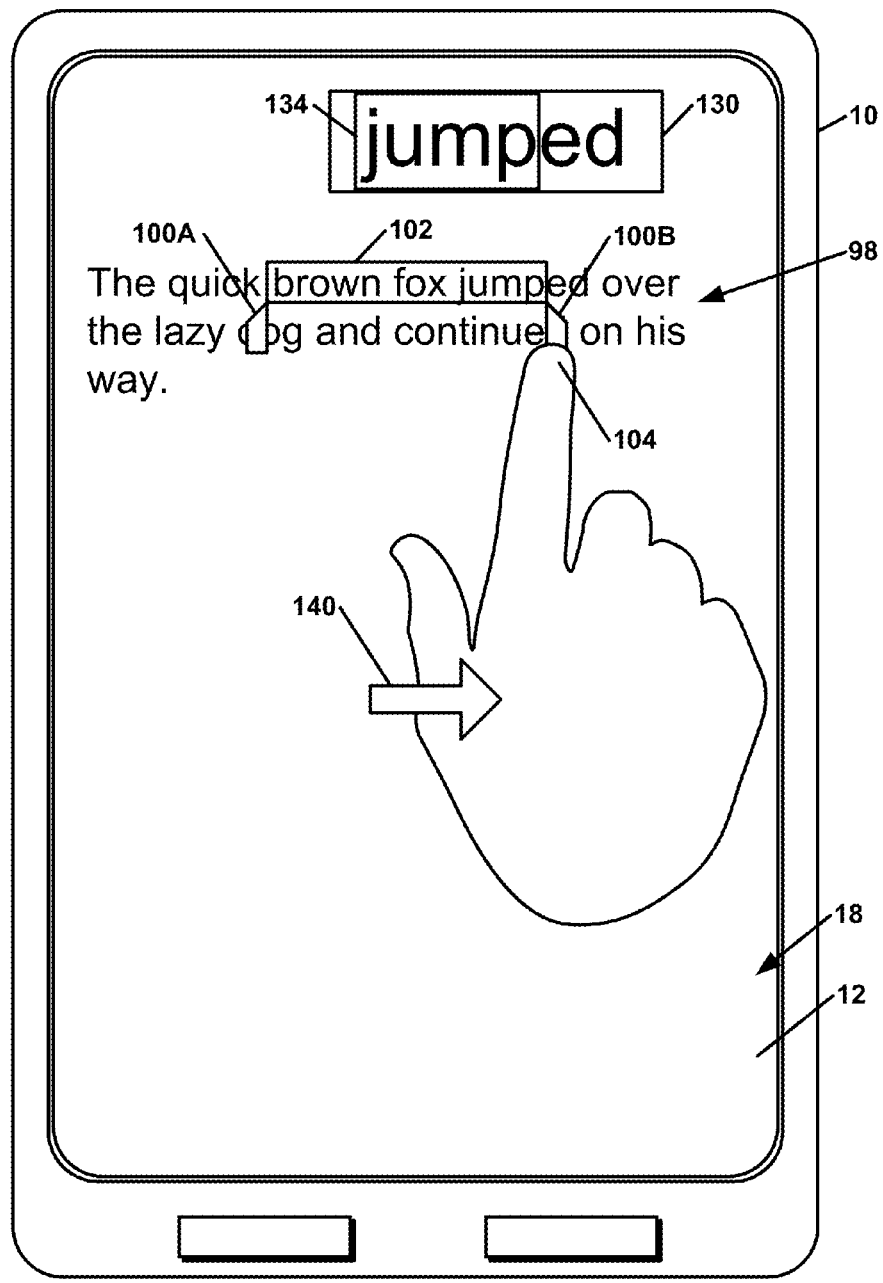
FIG. 8 is a conceptual diagram that illustrates an example configuration of the GUI of FIG. 7 after the computing device detects a further sliding movement that originates at a location on the user interface device that corresponds to a second handle element.

FIG. 8 is a conceptual diagram that illustrates an example configuration of GUI 18 of FIG. 7 after computing device 10 detects a further sliding movement that originates at a location on user interface device 12 that corresponds to handle element 100B. As illustrated in the example of FIG. 8, the user has moved fingertip 104 further rightward as shown by arrow 140. In response to detecting this further movement of fingertip 104, computing device 10 has modified GUI 18 such that handle element 100B is at a location on user interface device 12 that corresponds to a destination location of the further movement of fingertip 104.

In the example of FIG. 8, computing device 10 has modified GUI 18 such that handle element 100B is located between the letters "p" and "e" of the word "jumped." In addition, computing device 10 has included the additional letters "m" and "p" of the word "jumped" in the series of selected characters. Accordingly, computing device 10 has modified GUI 18 such that box 102 encompasses all characters of each complete word between handle element 100A and handle element 100B plus the letters "jump" of the word "jumped." In addition, computing device 10 has modified GUI 18 such that box 134 in magnification element 130 encompasses the letters "j," "u," "m," and "p" of the word "jumped."

Figure 9:
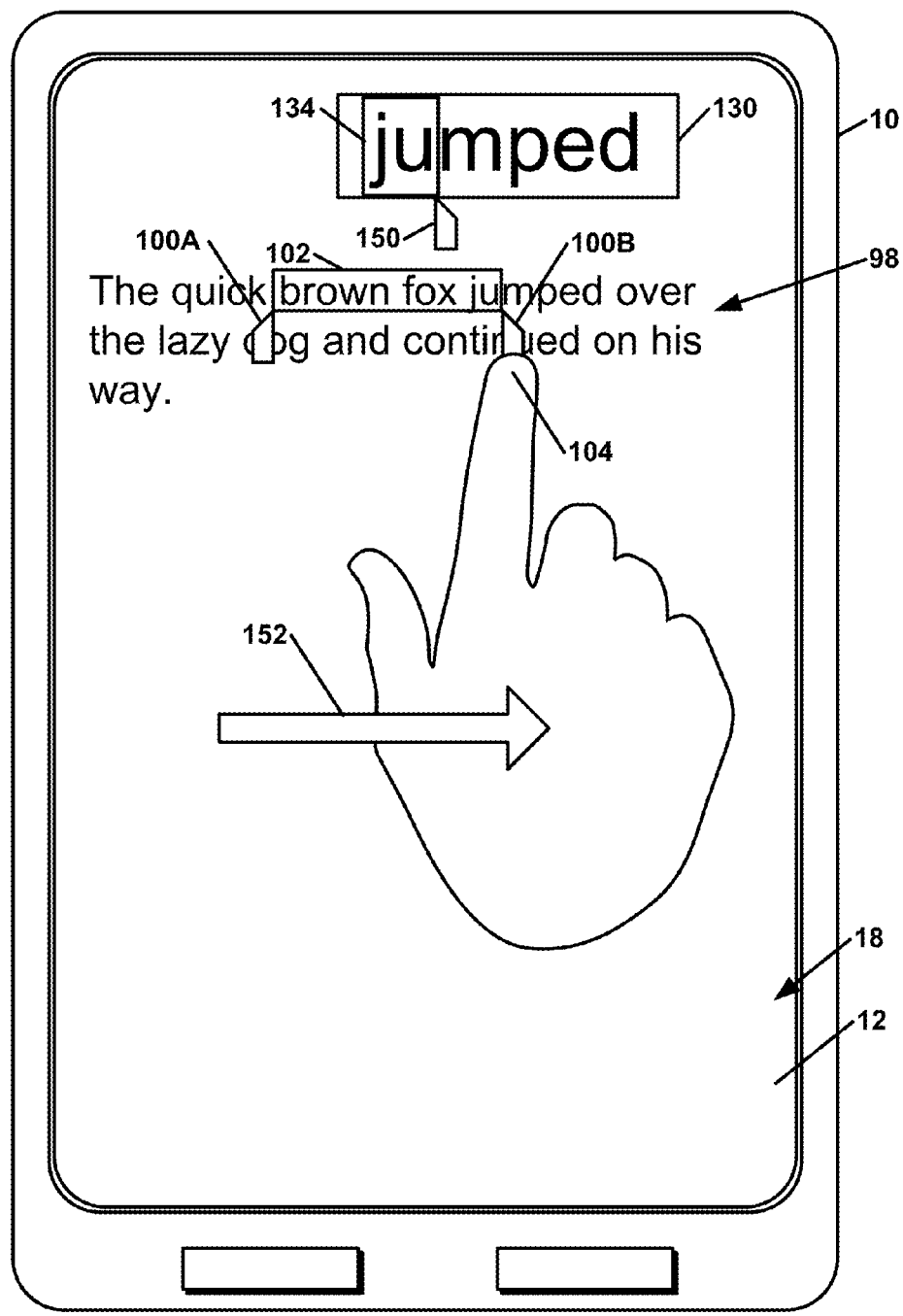
FIG. 9 is a conceptual diagram that illustrates an example configuration of a GUI that includes a magnification element and a supplemental handle element.

FIG. 9 is a conceptual diagram that illustrates an example configuration of GUI 18 that includes magnification element 130 and a supplemental handle element 150. As illustrated in the example of FIG. 9, the user has moved fingertip 104 rightward as shown by arrow 152. In response to detecting the movement of fingertip 104, computing device 10 has modified GUI 18 such that handle element 100B is at a location on user interface device 12 that corresponds to a destination location of the movement of fingertip 104.

In the example of FIG. 9, computing device 10 has modified GUI 18 such that handle element 100B is located between the letters "u" and "m" in the word "jumped." In addition, computing device 10 has modified GUI 18 to include magnification element 130. Box 134 encompasses characters of the word "jumped" that are in the series of selected characters.

Figure 10:
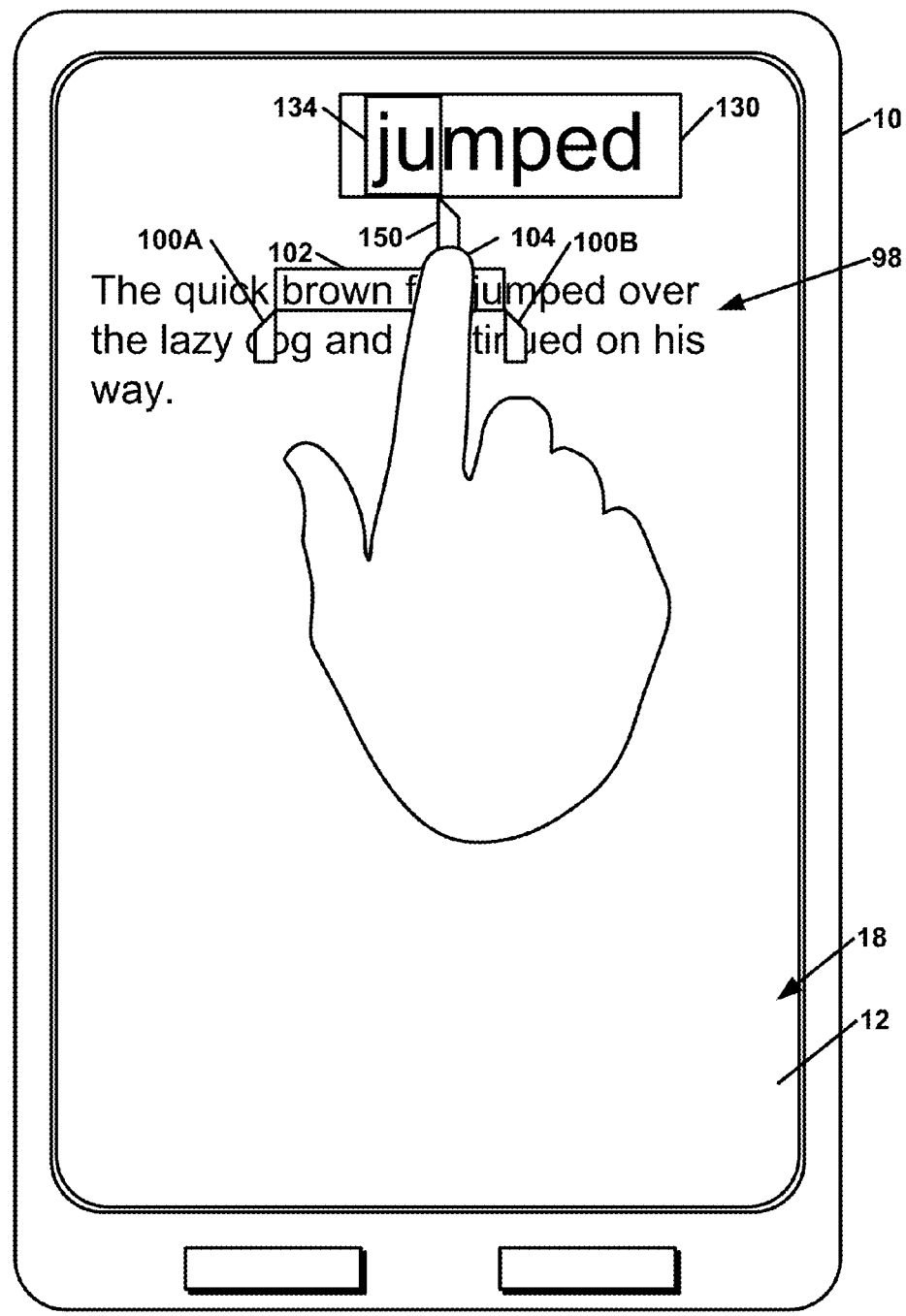
FIG. 10 is a conceptual diagram that illustrates an example configuration of the GUI of FIG. 8 in which the user has moved a fingertip to a location on the user interface device associated with the supplemental handle element.
Figure 11:
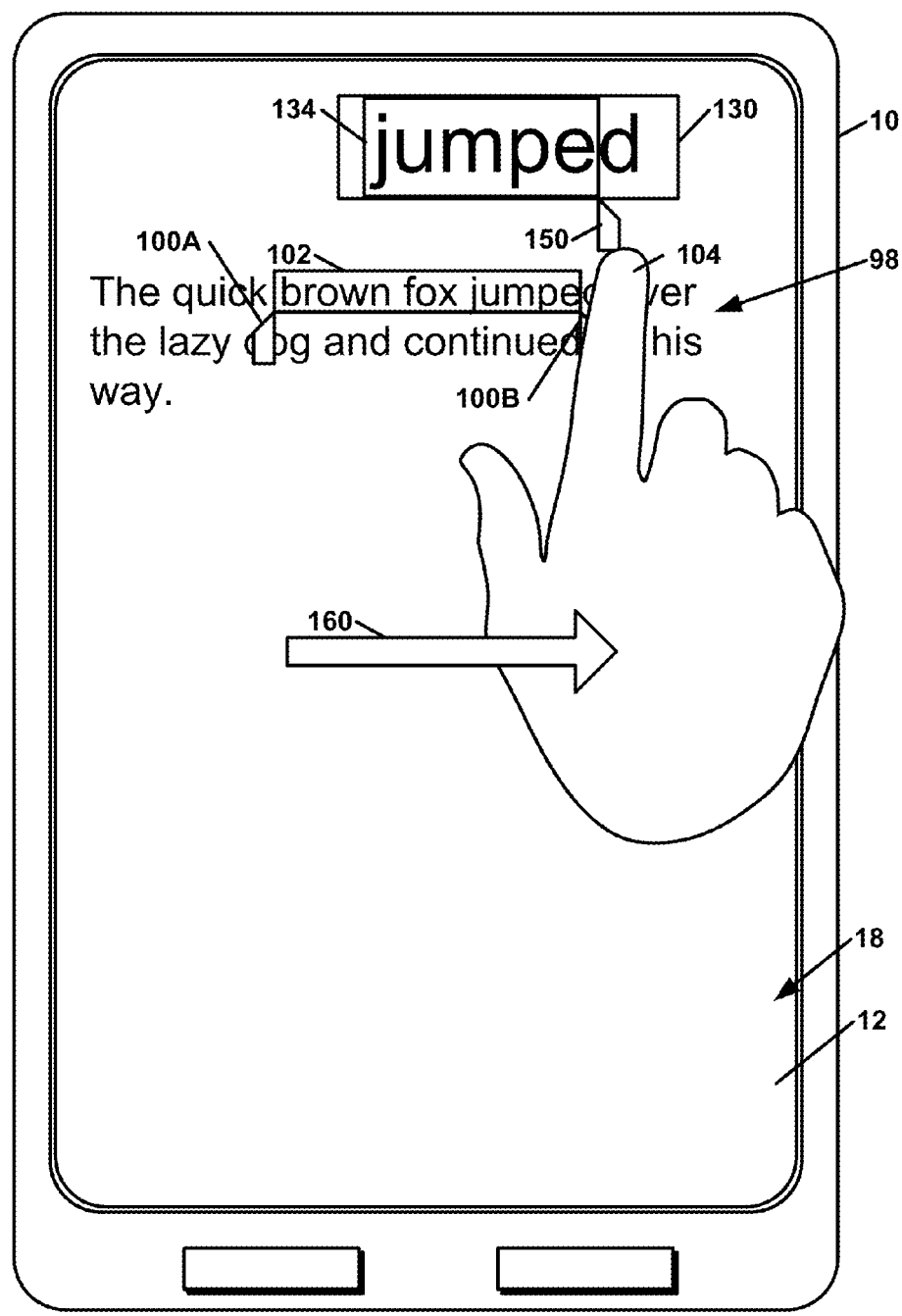
FIG. 11 is a conceptual diagram that illustrates an example configuration of the GUI of FIG. 10 after the computing device has detected a sliding movement that originates at a location on the user interface device that corresponds to the supplemental handle element.

FIG. 10 is a conceptual diagram that illustrates an example configuration of GUI 18 shown in FIG. 9 in which the user has moved fingertip 104 to a location on user interface device 12 associated with supplemental handle element 150. FIG. 11 is a conceptual diagram that illustrates an example configuration of GUI 18 shown in FIG. 10 after computing device 10 has detected a sliding movement that originates at a location on user interface device 12 that corresponds to the supplemental handle element. In the example of FIG. 11, the user has moved fingertip 104 rightward as shown by arrow 160. In response to the movement, computing device 10 has modified GUI 18 such that supplemental handle element 150 is located at a location on user interface device 12 associated with a destination location of the movement. In the example of FIG. 11, computing device 10 has modified GUI 18 such that supplemental handle element 150 is located between the "e" and "d" characters of the word "jumped" in magnification element 130. Accordingly, box 134 encompasses the letters "j," "u," "m," "p," and "e" of the word "jumped." In addition, computing device 10 has modified GUI 18 such that handle element 100B is located at a corresponding position in character string 98. In particular, handle element 100B is located between the characters "e" and "d" in the word "jumped" in character string 98.

Figure 12:
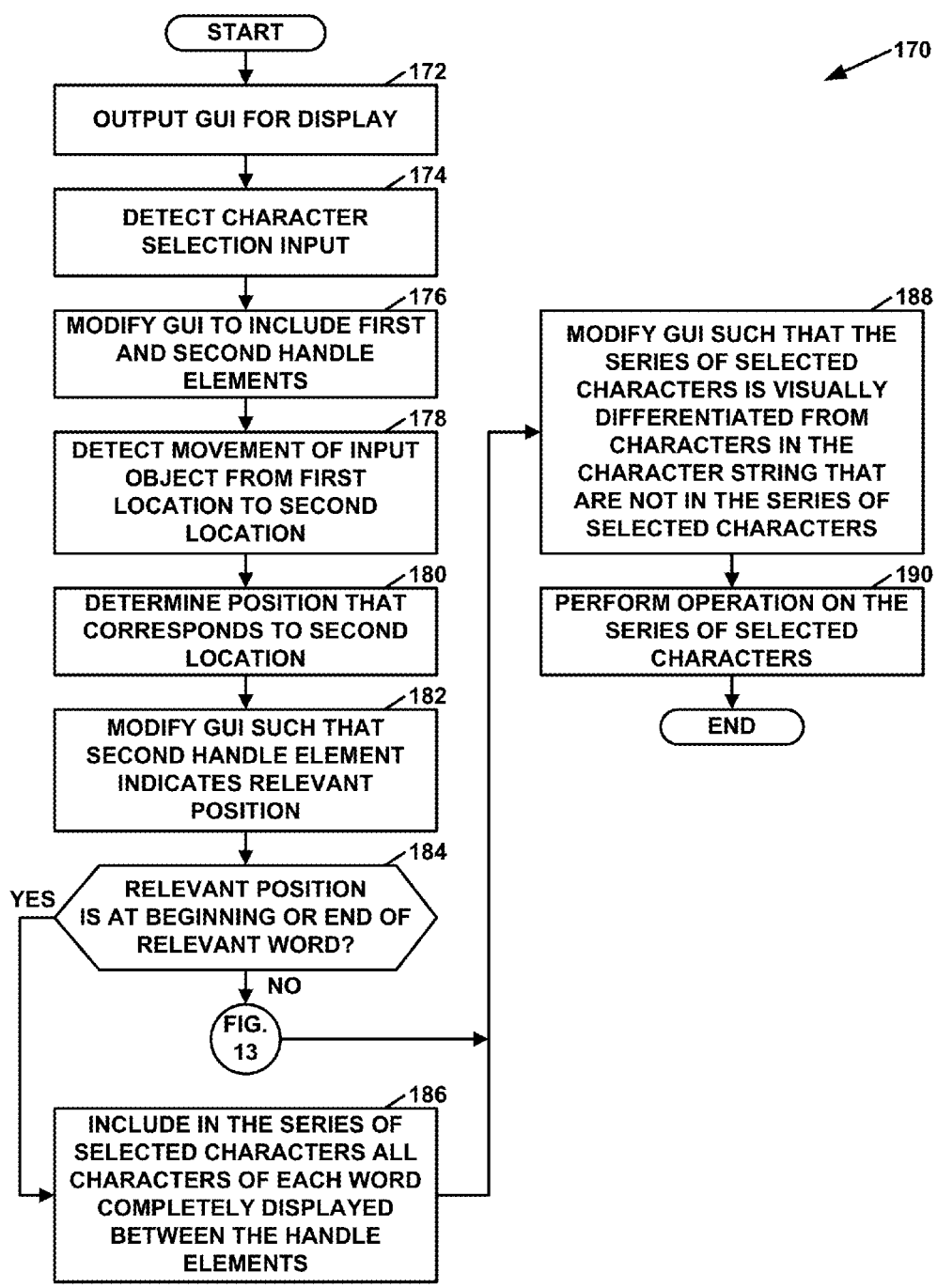
FIG. 12 is a flowchart that illustrates an example character selection operation of a computing device.

FIG. 12 is a flowchart that illustrates an example character selection operation 170 of computing device 10. Although FIG. 12 and the following figures are explained with reference to FIG. 1A, the techniques of this disclosure are not limited to the example of FIG. 1A and computing device 10. Furthermore, operation 170 and operations illustrated in other flowcharts of this disclosure are but examples. Other operations may include more, fewer, or different acts.

After computing device 10 starts operation 170, computing device 10 may output GUI 18 for display at user interface device 12 (172). GUI 18 may include a character string that includes a series of substrings. Each of the substrings may be a word or a number. While user interface device 12 is displaying GUI 18, computing device 10 may detect character selection input at user interface device 12 (174). In response to detecting the character selection input, computing device 10 may modify GUI 18 to include a first and a second handle element (176).

Figure 13:
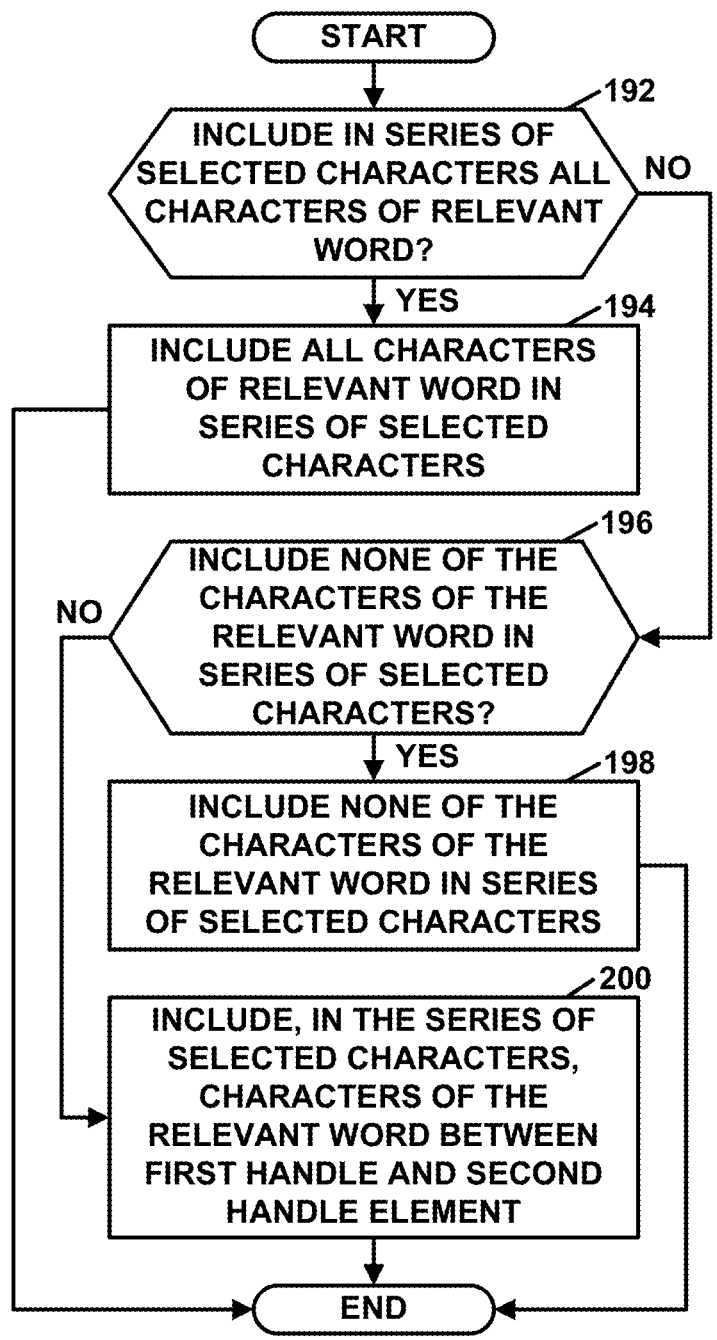
FIG. 13 is a flowchart that illustrates a portion of the example character selection operation of FIG. 12.

Computing device 10 may then detect a movement of an input object from a first location on user interface device 12 to a second location on user interface device 12 (178). The first location may correspond to the second handle element. In the discussion of FIGS. 12 and 13, the second handle element may occur before or after the first handle element in the character string.

In response to detecting the movement of the input object, computing device 10 may determine a position in the character string that corresponds to the second location (180). In other words, computing device 10 may determine the relevant position within the character string. Next, computing device 10 may modify GUI 18 such that the second handle element indicates the relevant position (182). In addition, computing device 10 may determine whether the relevant position is at a beginning or end of a word in the series of words in the character string (184). In other words, computing device 10 may determine whether the relevant position is at the beginning or end of the relevant word. In response to determining that the relevant position is not at the beginning or end of the relevant word ("NO" of 184), computing device 10 may perform the portion of text selection operation 170 shown in FIG. 13. Thus, the second location may correspond to a particular position in the character string that is not at a beginning or end of a word in the series of words in the character string. In the example of FIG. 12, the portion of text selection operation 170 shown in FIG. 13 is represented by a circle labeled "FIG. 13."

On the other hand, in response to determining that the determined character is at the beginning or end of the relevant word ("YES" of 184), computing device 10 may include in the series of selected characters all characters of each word completely displayed between the handle elements (186). If the user previously moved the first handle element to a position within another word and computing device 10 made the determination to include all or none of the characters of the other words, the series of selected characters may include one or more characters of the other word that are beyond the first handle element or exclude one or more characters of the other word that are between the handle elements.

After including the characters in the series of selected characters or after performing the portion of text selection operation 170 shown in FIG. 13, computing device 10 may modify GUI 18 such that the series of selected characters is visually differentiated from characters in the character string that are not in the series of selected characters (188). Computing device 10 may then perform an operation on the series of selected characters (190).

FIG. 13 is a flowchart that illustrates a portion of the example character selection operation of FIG. 12. In response to determining that the relevant position is not at a beginning or end of the relevant word, computing device 10 may determine whether to include in the series of selected characters all characters of the relevant word (192). The series of selected characters may further include all characters of each of the words that are completely displayed between the first handle element and the second handle element. As discussed above, computing device 10 may determine, based on one or more factors, whether to include in the series of selected characters all characters of the relevant word. For example, computing device 10 may determine, based at least in part on a speed of the movement of the input object, whether to include all characters in the relevant word in the series of selected characters.

In response to making the determination to include in the series of selected characters all characters of the relevant word ("YES" of 192), computing device 10 may include all characters of the relevant word in the series of selected characters (194). The portion of text selection operation 170 shown in FIG. 13 may then end and computing device 10 may continue performing the portion of text selection operation 170 shown in FIG. 12.

However, in response to making the determination not to include in the series of selected characters all characters of the relevant word ("NO" of 192), computing device 10 may determine whether to include in the series of selected characters none of the characters of the relevant word (196). As discussed above, computing device 10 may determine, based on one or more factors, whether to include in the series of selected characters none of the characters of the relevant word. For example, computing device 10 may determine, based at least in part on a speed of the movement of the input object and a location within the relevant word of the relevant position, whether to include none of the characters of the relevant word in the series of selected characters.

In response to making the determination to include in the series of selected characters none of the characters of the relevant word ("YES" of 196), computing device 10 may include none of the characters of the relevant word in the series of selected characters (198). The portion of text selection operation 170 shown in FIG. 13 may then end and computing device 10 may continue performing the portion of text selection operation 170 shown in FIG. 12.

However, in response to making the determination not to include in the series of selected characters none of the characters of the relevant word ("NO" of 198), computing device 10 may include, in the series of selected characters, characters of the relevant word that are between the first handle element and the second handle element (200). The portion of text selection operation 170 shown in FIG. 13 may then end and computing device 10 may continue performing the portion of text selection operation 170 shown in FIG. 12. In this way, computing device 10 may modify, based at least in part on the determination of whether to include all characters of the relevant word in the series of selected characters, the GUI such that the series of selected characters is visually differentiated from characters in the character string that are not in the series of selected characters.

Figure 14:
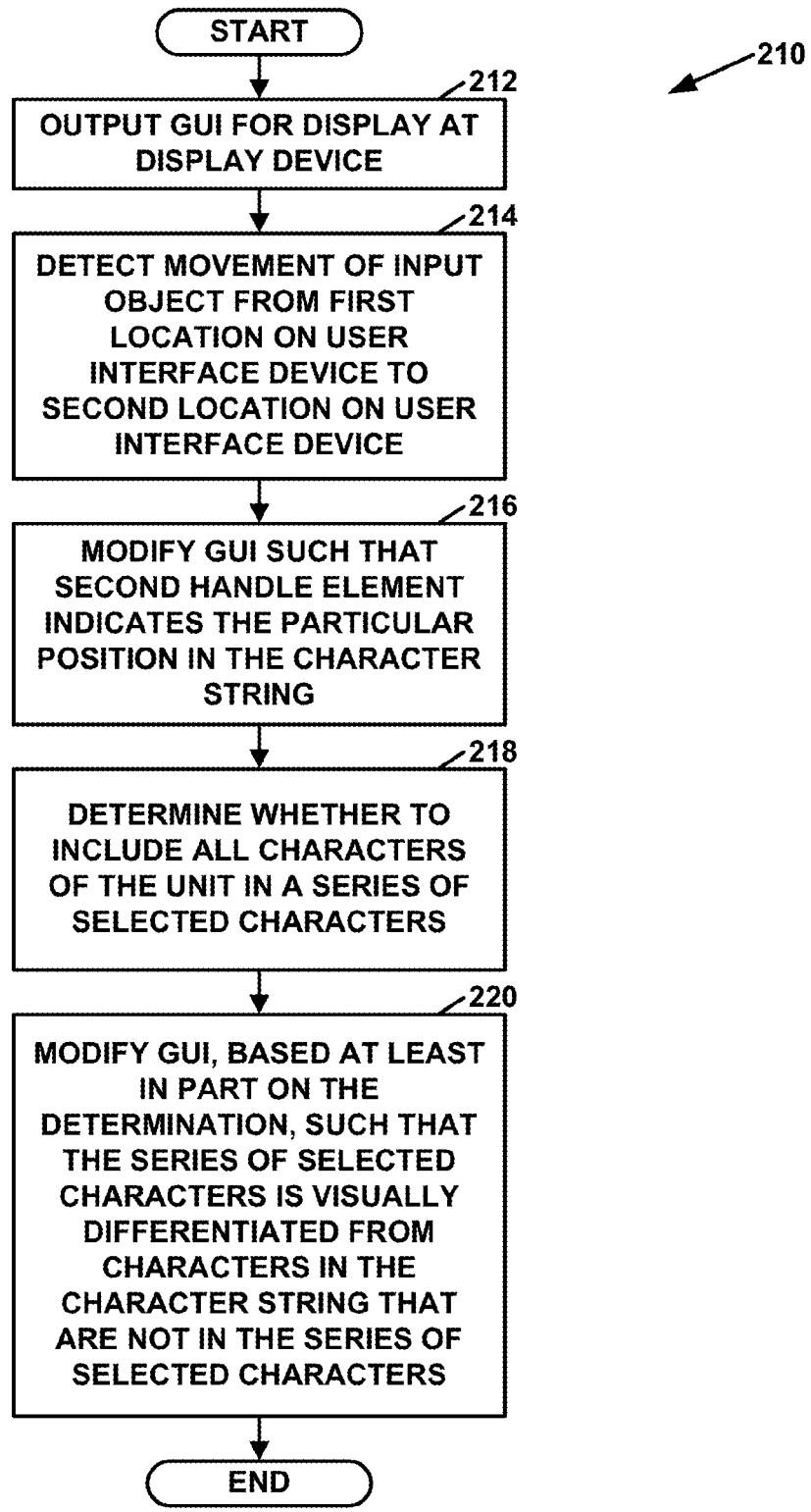
FIG. 14 is a flowchart that illustrates an example operation of the computing device for selecting text.

FIG. 14 is a flowchart that illustrates an example operation 210 of computing device 10 for selecting text. As illustrated in the example of FIG. 14, computing device 10 output GUI 18 for display at a display device, such as user interface device 12 (212). GUI 18 includes a first handle element, a second handle element, and a character string that includes a series of substrings. Furthermore, computing device 10 may detect a movement of an input object from a first location on user interface device 12 to a second location on user interface device 12 (214). The first location may correspond to the second handle element. The second location may correspond to a particular position in the character string that is not at a beginning or an end of a substring in the series of substrings.

In response to detecting the movement of the input object, computing device 10 may modify GUI 18 such that the second handle element indicates the particular position in the character string (216). In addition, computing device 10 may determine, based at least in part on a speed of the movement of the input object, whether to include all characters of the substring in a series of selected characters (218). The series of selected characters may further include all characters of each of the substrings that are completely displayed between the first handle element and the second handle element. Computing device 10 may also modify GUI 18, based at least in part on the determination, such that the series of selected characters is visually differentiated from characters in the character string that are not in the series of selected characters (220).

Figure 15:
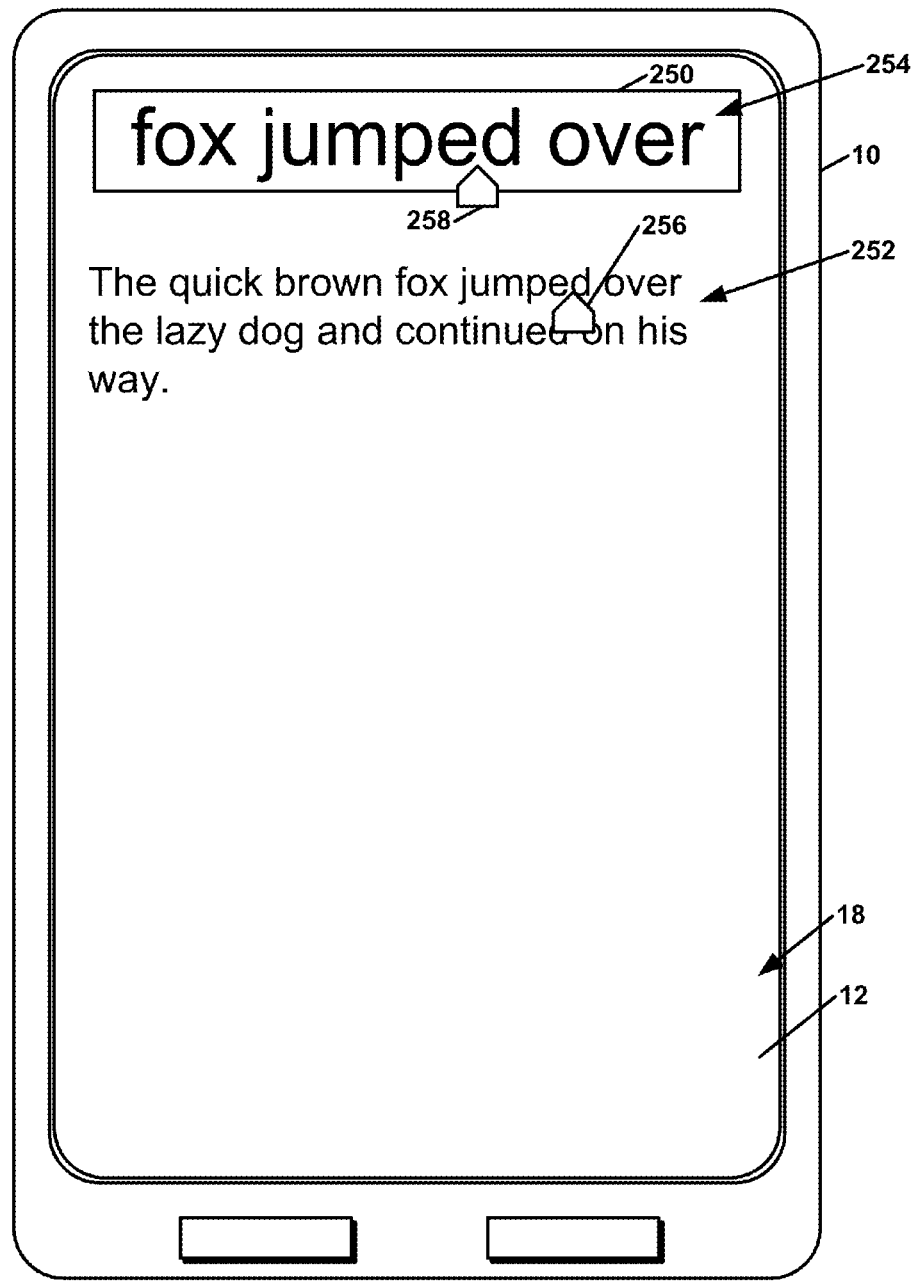
FIG. 15 is a conceptual diagram that illustrates an example GUI that includes a magnification element for repositioning a cursor.

FIG. 15 is a conceptual diagram that illustrates an example configuration of GUI 18 that includes a magnification element 250 for repositioning a cursor. As illustrated in the example of FIG. 15, GUI 18 includes a first text 252. In the example of FIG. 15, first text 252 reads "The quick brown fox jumped over the lazy dog and continued on his way." Magnification element 250 includes a second text 254. Text 254 is a copy of a portion of text 252. For instance, in the example of FIG. 15, text 254 reads "fox jumped over."

GUI 18 includes a first cursor 256 and a second cursor 258. Cursor 256 is located on user interface device 12 such that cursor 256 indicates a position within text 252 between the letters "e" and "d" in the word "jumped." Cursor 258 is located on user interface device 12 at a position within text 254 that corresponds to the position within text 252 indicated by cursor 256. In particular, cursor 257 is located on user interface device 12 such that cursor 258 indicates a position within text 254 between the letters "e" and "d" in the word "jumped."

Figure 16:
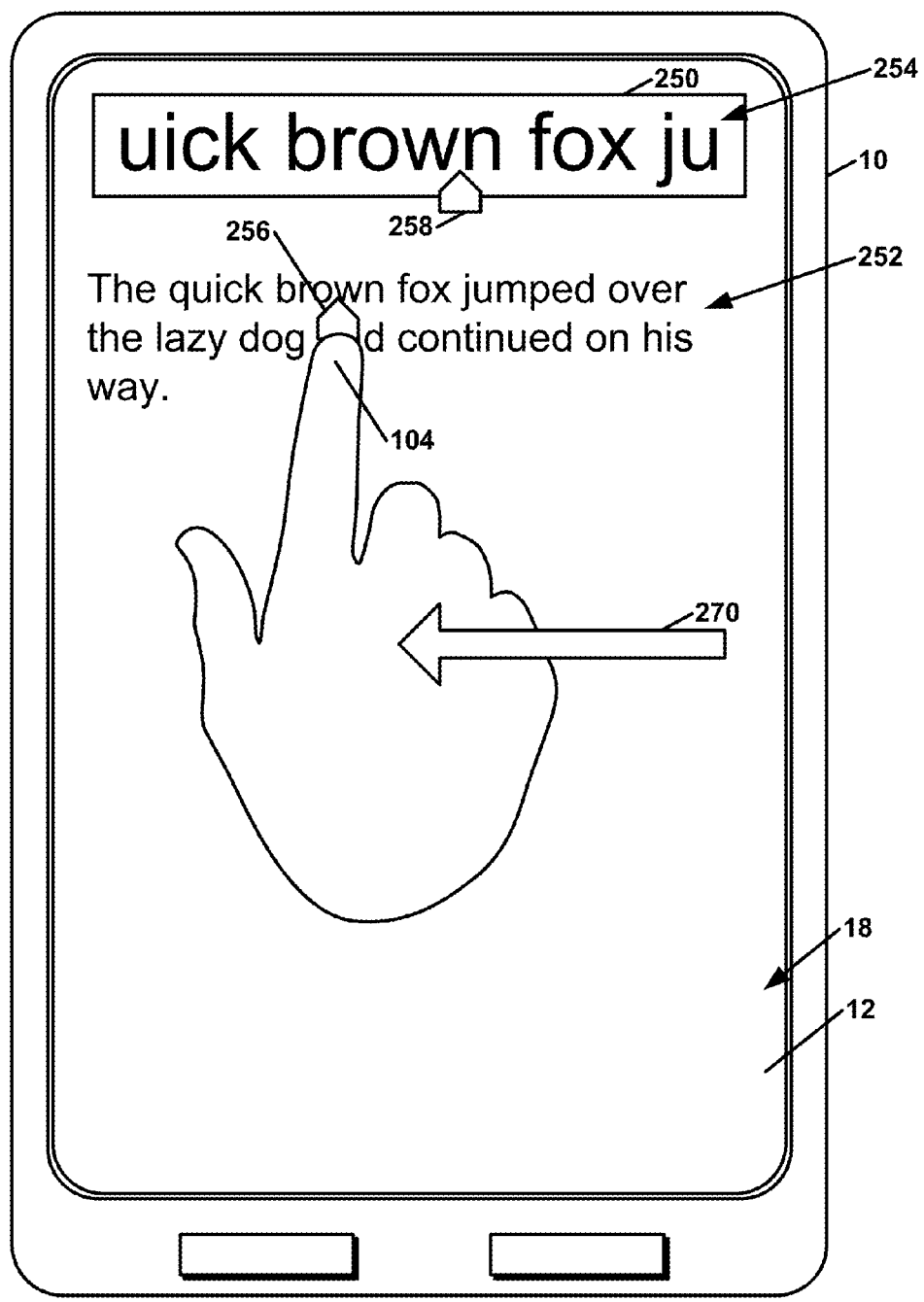
FIG. 16 is a conceptual diagram that illustrates an example configuration of the GUI of FIG. 15 in which a computing device has detected a movement of a fingertip that starts at a location associated with a first cursor.

FIG. 16 is a conceptual diagram that illustrates an example configuration of GUI 18 in which computing device 10 has detected a movement of fingertip 104 that starts at a location associated with cursor 256. As illustrated in the example of FIG. 16, computing device 10 may detect fingertip 104 at a location on user interface device 12 associated with cursor 256. Computing device 10 may then detect a leftward movement of fingertip 104 as shown by arrow 270. In response to detecting the movement, computing device 10 has modified GUI 18 such that cursor 256 now indicates a position within text 252 that corresponds to the ending location of the movement. In particular, computing device 10 has modified GUI 18 such that cursor 256 now indicates a position within text 252 between the letters "o" and "w" in the word "brown." In addition, computing device 10 has modified GUI 18 such that cursor 258 indicates a position within text 254 that corresponds to position in text 252 indicated by cursor 256. In particular, computing device 10 has modified GUI 18 such that cursor 258 now indicates a position within text 254 between letters "o" and "w" in the word "brown." As shown in the example of FIG. 16, computing device 10 may modify which portion of text 254 is shown in magnification element 250 if the position indicated by cursor 256 is not shown in magnification element 250.

Figure 17:
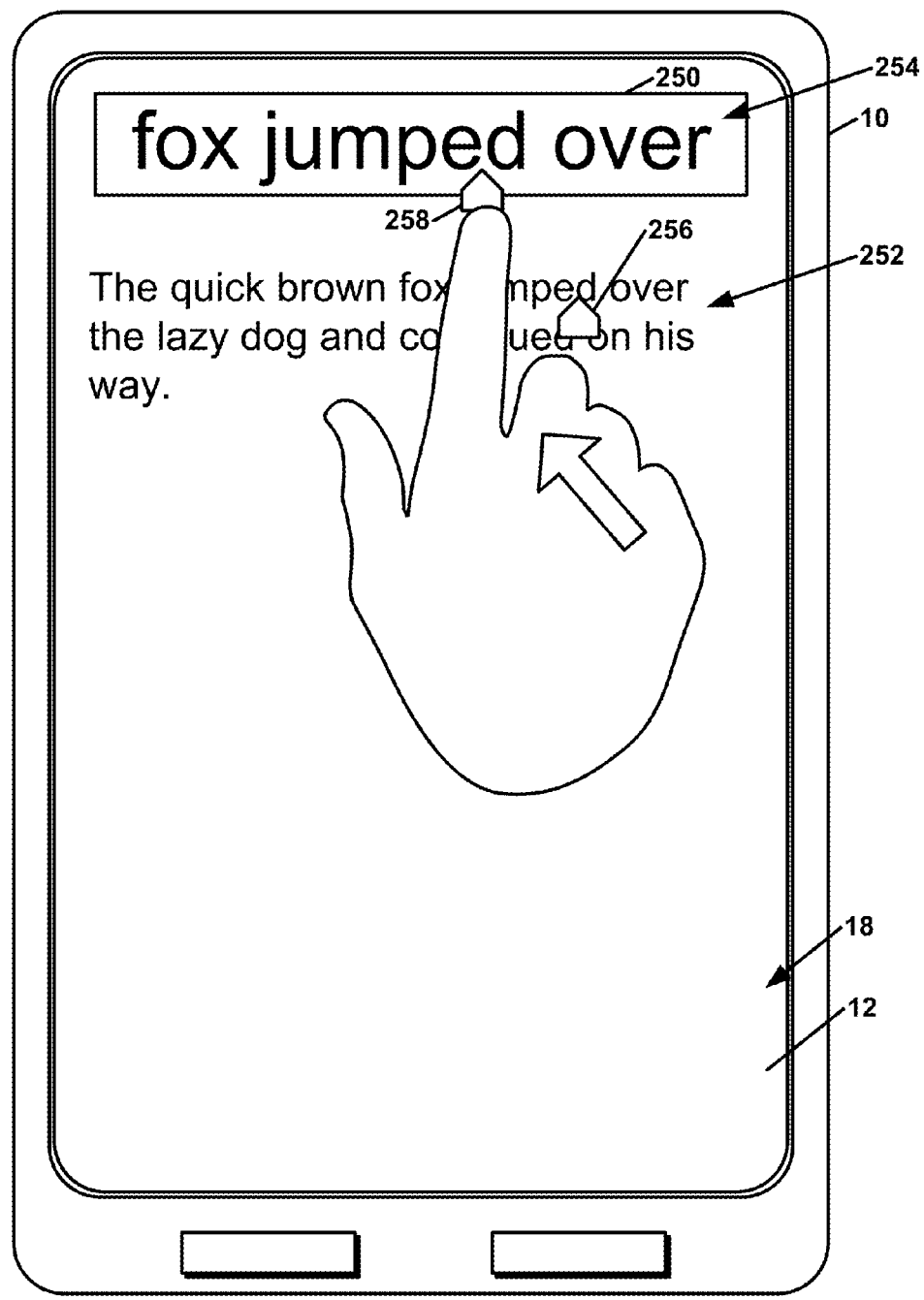
FIG. 17 is a conceptual diagram that illustrates an example configuration of the GUI of FIG. 15 in which the user has moved a fingertip to a location on the user interface device associated with a second cursor.
Figure 18:
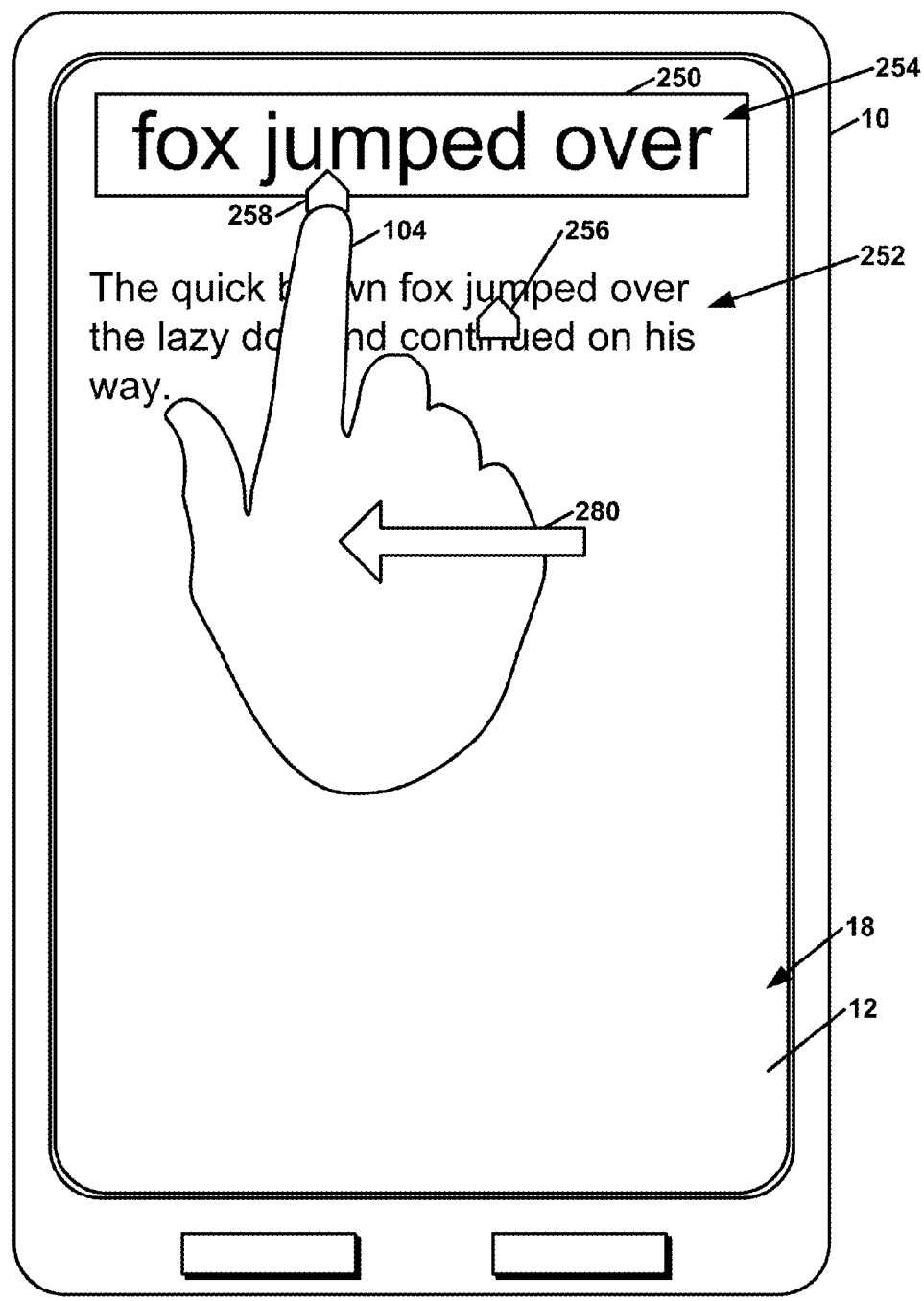
FIG. 18 is a conceptual diagram that illustrates an example configuration of the GUI of FIG. 17 after the computing device has detected a sliding movement that originates at a location on the user interface device that corresponds to the second cursor.

FIG. 17 is a conceptual diagram that illustrates the example configuration of GUI 18 as shown in FIG. 15 in which the user has moved fingertip 104 to a location on user interface device 12 associated with cursor 258. FIG. 18 is a conceptual diagram that illustrates an example configuration of GUI 18 as shown in FIG. 17 after computing device 10 has detected a sliding movement that originates at a location on user interface device 12 that corresponds to cursor 258. As illustrated in FIG. 18, computing device 10 may detect fingertip 104 at a location on user interface device 12 associated with cursor 258. Computing device 10 may then detect a leftward movement of fingertip 104 as shown by arrow 280. In response to detecting the movement, computing device 10 has modified GUI 18 such that cursor 258 now indicates a position within text 254 that corresponds to the ending location of the movement. In particular, computing device 10 has modified GUI 18 such that cursor 256 now indicates a position within text 254 between the characters "u" and "m" in the word "jumped." In addition, computing device 10 has modified GUI 18 such that cursor 256 indicates a position within text 252 that corresponds to the position in text 254 indicated by cursor 254. In particular, computing device 10 has modified GUI 18 such that cursor 258 now indicates a position within text 252 between the characters "u" and "m" in the word "jumped."

Figure 19:
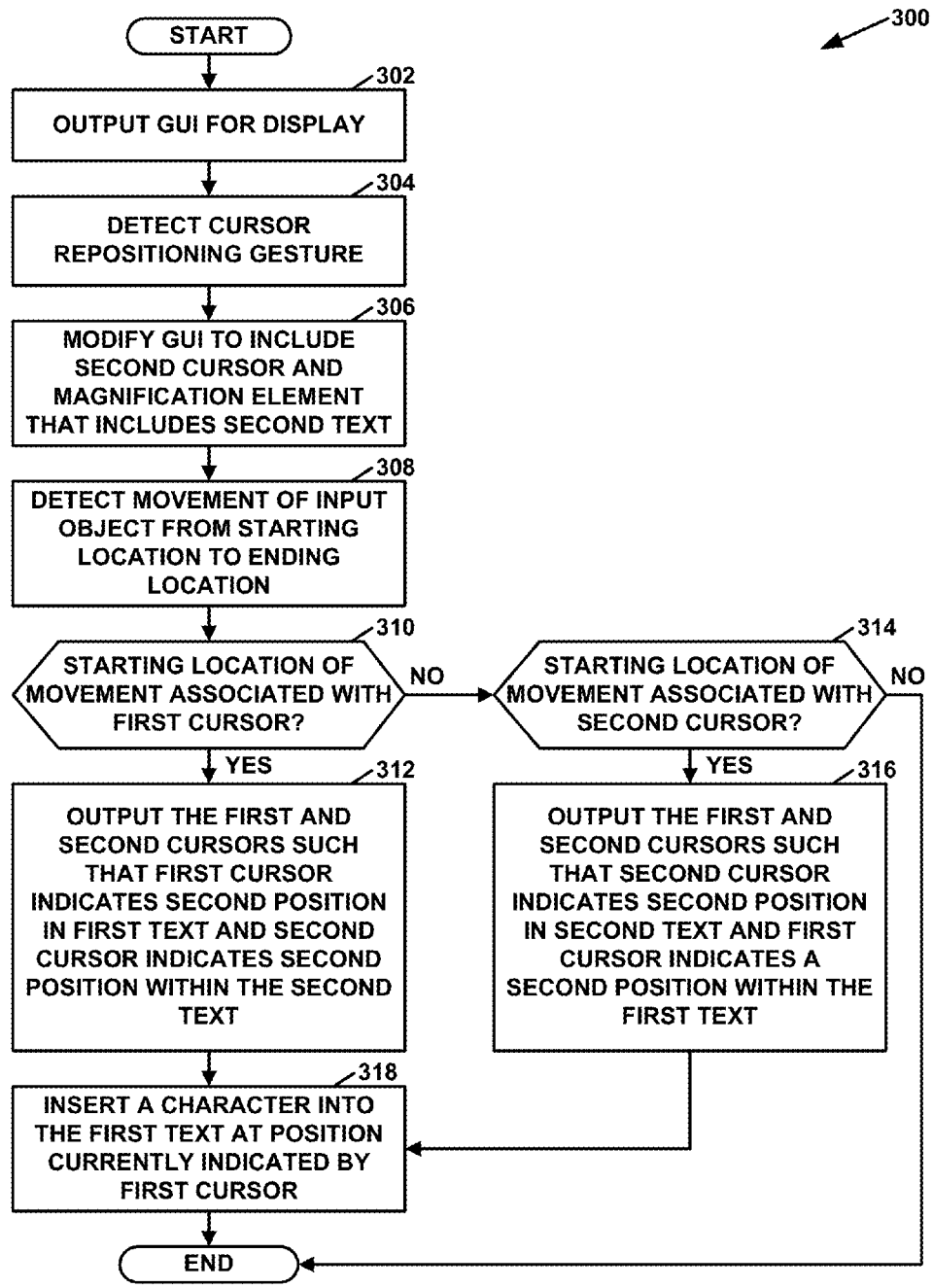
FIG. 19 is a flowchart that illustrates an example operation of a computing device in which the computing device repositions a cursor.

FIG. 19 is a flowchart that illustrates an example operation 300 of computing device 10 in which computing device 10 repositions a cursor. In the example of FIG. 19, computing device 10 may output GUI 18 for display at user interface device 12 (302). GUI 18 may include a first text. In other words, GUI 18 may include a first character string. In addition, GUI 18 may include a first cursor. The first cursor may indicate a first location within the first text.

Subsequently, computing device 10 may detect a cursor repositioning gesture at user interface device 12 (304). In response to detecting the cursor repositioning gesture, computing device 10 may modify GUI 18 such that GUI 18 includes a second cursor and a magnification element that contains a second text (306). The second text may be a copy of a portion of the first text that is displayed at a larger size than the first text. The second cursor may be at a second location on user interface device 12. The second cursor may indicate a position within the second text that corresponds to the first position within the first text (i.e., the current position of the first cursor).

In addition, computing device 10 may detect a movement of an input object from a starting location on user interface device 12 to an ending location on user interface device 12 (308). In response to detecting the movement of the input object, computing device 10 may determine whether the starting location is associated with the first cursor (310).

In response to determining that the starting location of the movement is associated with the first cursor ("YES" of 310), computing device 10 may output the first and second cursors such that the first cursor indicates a second position within the first text and the second cursor indicates a second position within the second text (312). If the starting location of the movement is associated with the first cursor, the second position within the first text corresponds to the ending location of the movement and the second position within the second text corresponds to the second position within the first text.

On the other hand, if the starting location of the movement is not associated with the first cursor ("NO" of 310), computing device 10 may determine whether the starting location of the movement is associated with the second cursor (314). In response to determining that the starting location of the movement is not associated with the second cursor ("NO" of 314), computing device 10 may perform one or more actions and operation 300 may end.

However, in response to determining that the starting location of the movement is associated with the second cursor ("YES" of 314), computing device 10 may output the first and second cursors such that the second cursor indicates a second position within the second text and the first cursor indicates a second position within the first text (316). If the starting location of the movement is associated with the second cursor, the second position within the second text may correspond to the ending location of the movement and the second position within the first text may correspond to the second position within the second text.

After outputting the first and second cursors in acts 312 or 316, computing device 10 may insert, in response to user input, a character into the first text at a position currently indicated by the first cursor (318). Operation 300 may subsequently end.

Figure 20:
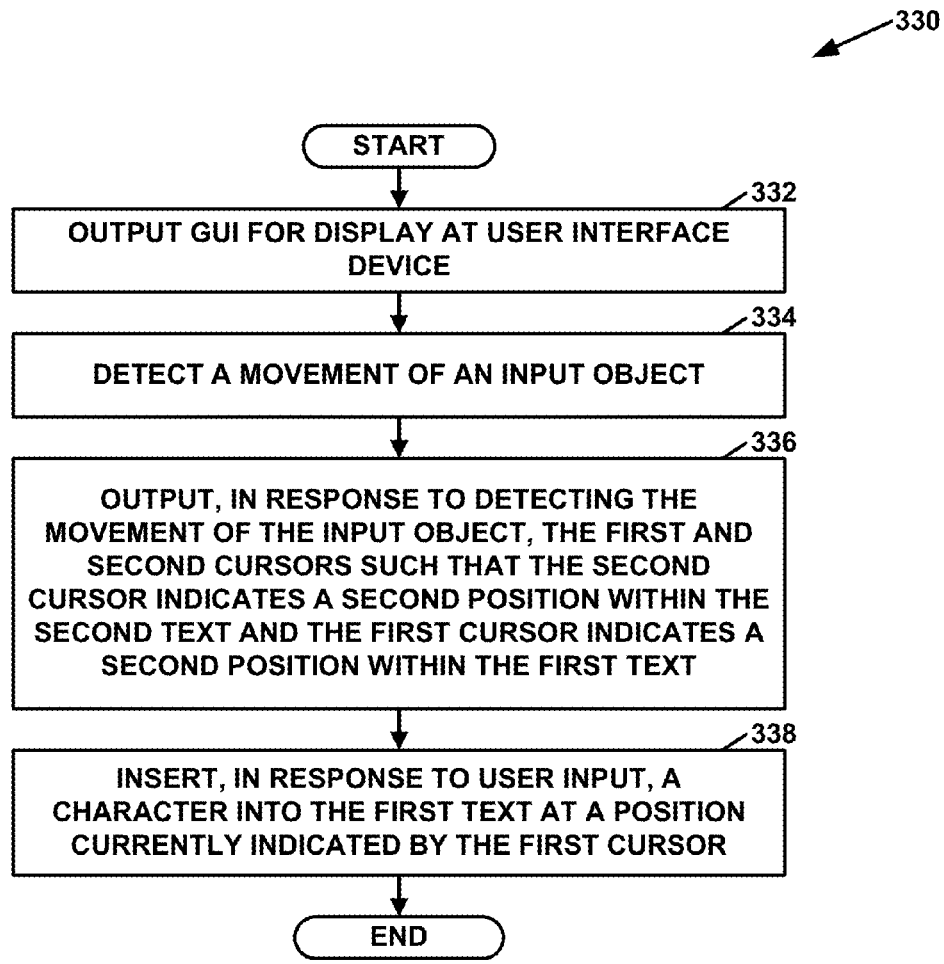
FIG. 20 is a flowchart that illustrates an example process for repositioning a cursor, in accordance with one or more aspects of the present disclosure.

FIG. 20 is a flowchart that illustrates an example process 330 for repositioning a cursor, in accordance with one or more aspects of the present disclosure. After computing device 10 starts process 330, computing device 10 may output GUI 18 for display at a display device, such as user interface device 12 (332). GUI 18 may include a first text and a second text. The second text may be a copy of a portion of the first text displayed at a larger size than the first text. GUI 18 may further include a first cursor and a second cursor. The first cursor may be output at a first location on user interface device 12 and the second cursor may be output at a second location on user interface device 12. The first cursor may indicate a first position within the first text and the second cursor may indicate a first position within the second text. The first position within the second text may correspond to the first position within the first text.

Next, computing device 10 may detect a movement of an input object from the second location on user interface device 12 to a third location on user interface device 12, the third location corresponding to a second, different position within the second text (334). Computing device 10 may detect the movement using a user interface device physically or operatively (e.g., via a network) coupled to computing device 10. Computing device 10 may then output, in response to detecting the movement of the input object, the first and second cursors such that the second cursor indicates the second position within the second text and the first cursor indicates a second position within the first text, the second position within the first text corresponding to the second position within the second text (336). Computing device 10 may insert, in response to user input, a character into the first text at a position currently indicated by the first cursor (338).

Figure 21:
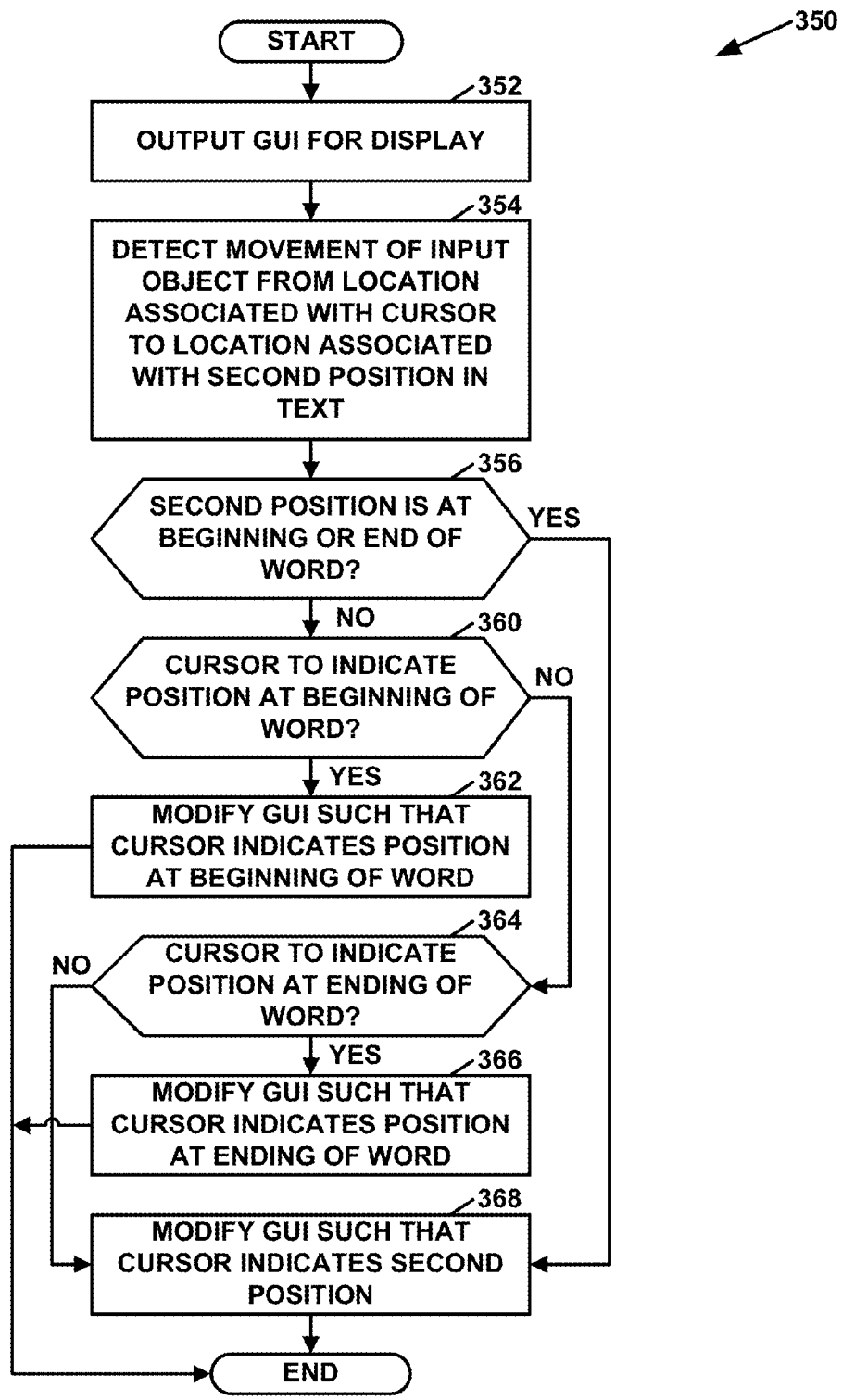
FIG. 21 is a flowchart that illustrates an example operation of a computing device in which the computing device repositions a cursor.

FIG. 21 is a flowchart that illustrates an example operation 350 of computing device 10 in which computing device 10 repositions a cursor. After computing device 10 starts operation 350, computing device 10 may output GUI 18 for display at user interface device 12 (352). GUI 18 may include a text and may include a cursor that indicates a first position within the text.

Computing device 10 may then detect a movement of an input object from a location on user interface device 12 that is associated with the cursor to a location on user interface device 12 that corresponds to a second position within the text (354). In response to detecting the movement of the input object, computing device 10 may determine whether the second position is at a beginning or ending of a word in the text (356). In response to determining that the second position is at the beginning or ending of the word ("YES" of 356), computing device 10 may modify GUI 18 such that the cursor indicates the second position within the text (358).

However, in response to determining that the second position is not at the beginning or ending of the word ("NO" of 356), computing device 10 may determine whether the cursor is to indicate a position in the text at the beginning of the word (360). If computing device 10 determines that the cursor is to indicate the position in the text at the beginning of the word ("YES" of 360), computing device 10 may modify GUI 18 such that the cursor indicates the position in the text at the beginning of the word (362).

If computing device 10 determines that the cursor is not to indicate the position in the text at the beginning of the word ("NO" of 360), computing device 10 may determine whether the cursor is to indicate a position in the text at the ending of the word (364). If computing device 10 determines that the cursor is to indicate the position in the text at the ending of the word ("YES" of 364), computing device 10 may modify GUI 18 such that the cursor indicates the position in the text at the ending of the word (366). If computing device 10 determines that the cursor is not to indicate the position in the text at the ending of the word ("NO" of 364), computing device 10 may modify GUI 18 such that the cursor indicates the second position within the text (368).

Computing device 10 may determine, based on one or more factors, whether the cursor is to indicate the beginning or ending of the word. For example, computing device 10 may determine, based at least in part on a speed of the movement of the input object, whether the cursor is to indicate the beginning or ending of the word. Other example factors may include the number and location of characters in the word that are already selected, the position of the cursor (e.g., relative to the endpoints), the direction of cursor movement, and so on.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   outputting, by a computing device and for display at a display device, a graphical user interface (GUI), the GUI including a first handle element, a second handle element, and a character string that includes a series of substrings, wherein the series of substrings includes an initial copy of a particular substring;
   receiving, by the computing device, an indication of a first movement of an input object from a first location to a second location, the first location corresponding to the second handle element, the second location corresponding to a first position in the character string, wherein the first position in the character string is adjacent to a character in the initial copy of the particular substring;
   in response to receiving the indication of the first movement of the input object:
      modifying, by the computing device, the GUI, such that the second handle element indicates the first position in the character string;
      outputting, by the computing device and for display at the display device, within the GUI and in addition to the character string, a magnification element and a third handle element, the magnification element including an enlarged copy of the particular substring that is larger than the initial copy of the particular substring, the third handle element being at a location that corresponds to a character in the enlarged copy of the particular substring;
   receiving, by the computing device, an indication of a second movement of the input object from a third location to a fourth location, the third location corresponding to the third handle element, the fourth location corresponding to a particular position in the enlarged copy of the particular substring; and
   in response to receiving the indication of the second movement of the input object:
      outputting, by the computing device and for display at the display device, the third handle element in the GUI such that the third handle element indicates the particular position in the enlarged copy of the particular substring, and such that the second handle element indicates a second position in the character string, the second position in the character string corresponding to the particular position in the enlarged copy of the particular substring; and
      modifying, by the computing device, the GUI, such that a series of selected characters is visually differentiated from characters in the character string that are not included in the series of selected characters, wherein the series of selected characters includes all characters of the character string between the first handle element and the second handle element.

2. The method of claim 1, wherein:
   the character in the initial copy of the particular substring is not at a beginning or an end of the initial copy of the substring, and
   the method further comprises, prior to receiving the indication of the second movement of the input object, determining, by the computing device and based at least in part on a speed of the first movement of the input object and a position within the initial copy of the particular substring of the first position, whether to include all the characters of the initial copy of the particular substring in the series of selected characters.

3. The method of claim 2, wherein the substring the method further comprises, prior to receiving the indication of the second movement of the input object, determining, by the computing device, to include all the characters of the initial copy of the particular substring in the series of selected characters if the first position in the character string is in a latter half of the initial copy of the particular substring.

4. The method of claim 1, wherein:
   the character in the initial copy of the particular substring is not at a beginning or an end of the initial copy of the substring, and
   the method further comprises, prior to receiving the indication of the second movement of the input object, determining, by the computing device and based at least in part on a speed of the first movement of the input object and a direction of the first movement, whether to include all the characters of the initial copy of the particular substring in the series of selected characters.

5. The method of claim 1, wherein:
   the character in the initial copy of the particular substring is not at a beginning or an end of the initial copy of the substring, and
   the method further comprises, prior to receiving the indication of the second movement of the input object:
      if a direction of the first movement of the input object corresponds to an increase in a number of characters in the series of selected characters, determining, by the computing device, that the series of selected characters includes all the characters of the initial copy of the particular substring; and
      if the direction of the first movement corresponds to a decrease in the number of characters in the series of selected characters, determining, by the computing device, that the series of selected characters does not include all of the characters of the initial copy of the particular substring.

6. The method of claim 1, wherein modifying the GUI such that the series of selected characters is visually differentiated comprises highlighting the series of selected characters.

7. The method of claim 1, further comprising performing, by the computing device and in response to receiving an indication of user input, an operation on the series of selected characters and not on the characters in the character string that are not in the series of selected characters.

8. The method of claim 7, wherein the operation is a copy, cut, or delete operation.

9. The method of claim 1, wherein:
   the character in the initial copy of the particular substring is not at a beginning or an end of the initial copy of the substring, and the method further comprises, prior to receiving the indication of the second movement of the input object, determining, by the computing device and based at least in part on a speed of the first movement of the input object and a location within the initial copy of the particular substring of the first position, whether to include none of the characters of the particular substring in the series of selected characters.

10. The method of claim 1, where outputting the magnification element comprises outputting, by the computing device, the magnification element in response to determining that a speed of the first movement of the input object has decreased while the input object is at a location that corresponds to the initial copy of the particular substring.

11. The method of claim 1, further comprising while the magnification element is displayed in the GUI, modifying, by the computing device and on a character-by-character basis, which characters of the initial copy of the particular substring are included in the series of selected characters in response to receiving an indication of a further movement of the input object.

12. The method of claim 1, wherein the particular substring is the only substring of the character string shown in the magnification element.

13. The method of claim 1, further comprising removing, by the computing device, the magnification element from the GUI in response to receiving an indication that the input object has moved to a location that is not associated with the initial copy of the particular substring.

14. The method of claim 1, wherein:
the first location, the second location, the third location, and the fourth location are locations on a user input device, and
the user interface device comprises the display device.

15. The method of claim 1, wherein the particular substring is a single word, number, or a semantically-meaningful subpart of a single word.

16. The method of claim 1, wherein:
the character in the initial copy of the particular substring is not at a beginning or an end of the initial copy of the substring, and
the method further comprises determining, by the computing device, based at least in part on a speed of the first movement of the input object, and prior to receiving the indication of the second movement of the input object, whether to include all the characters of the particular substring in the series of selected characters.

17. A computing device comprising:
one or more processors; and
one or more storage devices that store instructions that, when executed by the one or more processors, cause the computing device to:
output a graphical user interface (GUI) for display at a user interface device, the GUI including a first handle element, a second handle element, and a character string that includes a series of substrings, each of the substrings being a word or a number, wherein the series of substrings includes an initial copy of a particular substring;
receive an indication of a first movement of an input object from a first location to a second location, the first location corresponding to the second handle element, the second location corresponding to a first position in the character string, wherein the first position in the character string is adjacent to a character in the initial copy of the particular substring;
in response to receiving the indication of the first movement of the input object:
modify the GUI such that the second handle element indicates the first position in the character string;
determine a series of selected characters that includes all characters of each of the substrings that are completely displayed in the GUI between the first handle element and the second handle element;
modify the GUI such that the series of selected characters is visually differentiated from characters in the character string that are not included the series of selected characters;
output, for display at the display device, a magnification element within the GUI in addition to the character string, the magnification element including an enlarged copy of the particular substring that is larger than the initial copy of the particular substring; and
output, for display at the display device, a third handle element in the GUI at a location that corresponds to a character in the enlarged copy of the particular substring;
receive an indication that the input object is at a third location, the third location corresponding to the third handle element;
receive an indication of a second movement of the input object from the third location to a fourth location, the fourth location corresponding to a particular position in the enlarged copy of the particular substring; and
in response to receiving the indication of the second movement of the input object:
output, for display at the display device, the third handle element in the GUI such that the third handle element indicates the particular position in the enlarged copy of the particular substring, and such that the second handle element indicates a second position in the character string, the second position in the character string corresponding to the particular position in the enlarged copy of the particular substring; and
output, for display at the display device, one or more selected characters of the initial copy of the particular substring in the series of selected characters, the one or more selected characters of the initial copy of the particular substring including at least one character occurring in the particular substring between the first handle element and the second handle element.

18. The computing device of claim 17, wherein:
the character in the initial copy of the particular substring is not at a beginning or an end of the initial copy of the substring, and
the instructions, when executed by the one or more processors, cause the computing device to determine, based at least in part on a speed of the first movement of the input object, whether to include all the characters of the particular substring in the series of selected characters.

19. A computer readable storage medium that stores instructions that, when executed by one or more processors of a computing device, cause the computing device to:
output a graphical user interface (GUI) for display at a display device, the GUI including a first handle element, a second handle element, and a character string that includes a series of substrings, each of the substrings being a word or number, wherein the series of substrings includes an initial copy of a particular substring;
receive an indication of a first movement of an input object from a first location to a second location, the first location corresponding to the second handle element, the second location corresponding to a first position in the character string, wherein the first position in the character string is adjacent to a character in the initial copy of the particular substring;

in response to receiving the indication of the first movement of the input object:
  modify the GUI such that the second handle element indicates the first position in the character string;
  determine a series of selected characters that includes all characters of each of the substrings that are completely displayed in the GUI between the first handle element and the second handle element;
  modify the GUI such that the series of selected characters is visually differentiated from characters in the character string that are not included the series of selected characters;
  output, for display at the display device, a magnification element within the GUI in addition to the character string, the magnification element including an enlarged copy of the particular substring that is larger than the initial copy of the particular substring; and
  output, for display at the display device, a third handle element in the GUI at a location that corresponds to a character in the enlarged copy of the particular substring;

receive an indication that the input object is at a third location, the third location corresponding to the third handle element;

receive an indication of a second movement of the input object from the third location to a fourth location, the fourth location corresponding to a particular position in the enlarged copy of the particular substring; and in response to receiving the indication of the second movement of the input object:
  output, for display at the display device, the third handle element in the GUI such that the third handle element indicates the particular position in the enlarged copy of the particular substring, and such that the second handle element indicates a second position in the character string, the second position in the character string corresponding to the particular position in the enlarged copy of the particular substring; and
  output, for display at the display device, one or more selected characters of the initial copy of the particular substring in the series of selected characters, the one or more selected characters of the particular substring including at least one character occurring in the particular substring between the first handle element and the second handle element.

20. The computing readable storage medium of claim 19, wherein:
  the character in the initial copy of the particular substring is not at a beginning or an end of the initial copy of the substring, and
  the instructions, when executed by the one or more processors of the computing device, cause the computing device to determine, based at least in part on a speed of the first movement of the input object, whether to include all the characters of the particular substring in the series of selected characters.

* * * * *